(12) United States Patent
Ledford et al.

(10) Patent No.: US 12,131,134 B1
(45) Date of Patent: Oct. 29, 2024

(54) PHYSICAL COMPONENTS USING DATA ELEMENT MAPPING AND ANALYSIS

(71) Applicant: Auburn University, Auburn, AL (US)

(72) Inventors: Allison Brown Ledford, Auburn, AL (US); Gregory Allen Harris, Auburn, AL (US); Haley Patterson, Auburn, AL (US); Phillip Farrington, Auburn, AL (US)

(73) Assignee: AUBURN UNIVERSITY, Auburn, AL (US)

( * ) Notice: Subject to any disclaimer, the term of this patent is extended or adjusted under 35 U.S.C. 154(b) by 214 days.

(21) Appl. No.: 18/067,888

(22) Filed: Dec. 19, 2022

Related U.S. Application Data

(60) Provisional application No. 63/290,805, filed on Dec. 17, 2021.

(51) Int. Cl.
*G06F 8/20* (2018.01)
(52) U.S. Cl.
CPC ...................... *G06F 8/24* (2013.01)
(58) Field of Classification Search
CPC ..... G06F 16/252; G06F 16/9024; G06F 16/21
See application file for complete search history.

(56) References Cited

U.S. PATENT DOCUMENTS

| 6,701,420 B1* | 3/2004 | Hamilton | G06F 12/023 |
| | | | 711/170 |
| 11,416,646 B2 | 8/2022 | Westin et al. | |
| 11,433,977 B2 | 9/2022 | Knezevic et al. | |
| 2014/0059196 A1* | 2/2014 | Onffroy | G06F 11/3692 |
| | | | 709/223 |
| 2022/0171982 A1* | 6/2022 | Gosinski | G06V 10/443 |

FOREIGN PATENT DOCUMENTS

| CN | 111666372 A | * | 9/2020 | ......... G06F 16/2246 |

OTHER PUBLICATIONS

Jeffrey Scott Vitter; External Memory Algorithms and Data Structures: Dealing with Massive Data; ACM; pp. 209-271; retrieved on May 31, 2024 (Year: 2001).*

(Continued)

*Primary Examiner* — S. Sough
*Assistant Examiner* — Cuong V Luu
(74) *Attorney, Agent, or Firm* — Holland & Knight LLP; Matthew C. Cox

(57) ABSTRACT

A system for improving a physical component may include a processor configured to (1) access a first data storage that may include a plurality of function data objects or a plurality of data vessel data objects that may include references to each other; (2) iterate over the plurality of data vessel data objects, and for each data vessel data object, generate one or more data element instance data objects; (3) select a subset of the plurality of data element instance data objects that include the same data element identifier; (4) order the subset of the data element instance data objects based their respective one or more references to one or more other data element instance data objects; and (5) store the ordered subset of the data element instance data objects in a second data storage as a digital thread.

19 Claims, 9 Drawing Sheets

(56) References Cited

OTHER PUBLICATIONS

Mark D. Hill et al.; Making Pointer Based Data Structures Cache Conscious; IEEE; pp. 67-74; retrieved on May 31, 2024 (Year: 2000).*
Translated CN 111666372 A (Year: 2020).*
Griffin, M., Baldwin, K., Stanley, J., Kewley, Jr., R., Bray, W., "Department of defense digital engineering strategy, Jun. 2018." Office of the Deputy Assistant Secretary of Defense for Systems Engineering, 2018.
Hedburg, Jr., T. D., "Enabling connections in the product lifecycle using the digital thread," PHD thesis, Virginia Technological University, 2018.
Incose and Wiley Miller, "Incose systems engineering handbook: A guide for systems life cycle processes and activities, fourth edition," 2015.
Kagermann, H., Helbig, J., Hellinger, A., Wahlster, W., "Recommendations for implementing the strategic initiative INDUSTRIE 4.0: Securing the future of German manufacturing industry; final report of the Industrie 4.0 Working Group." Forschungsunion; 2013.
National Aeronautics and Space Administration (NASA), NASA Systems Engineering Handbook, rev 1 ed., 2007.
National Institute of Standards and Technology, "Integration Definition for Function Modeling," Dec. 21, 1993.
National Institute of Standards and Technology, "Federal information processing standards publication: Integration definition for function modeling (IDEF0)," U.S. Department of Commerce, Technology Administration.
Sampaio, A., "Historical evolution of technical drawing in engineering," in 2018 3rd International Conference of the Portuguese Society for Engineering Education (CISPEE), 2018.
Yarbrough, A., Harris, G., Purdy, G., Loyd, N., "Developing Taiichi Ohno's mental model for waste identification in nontraditional applications," ASME Open Journal of Engineering, vol. 1, 2022.
Zhong, D., Fan, J., Yang, G., Tian, B. Yukun, Z., "Knowledge management of product design: A requirements-oriented knowledge management framework based on Kansei engineering and knowledge map," Advanced Engineering Informatics 52 (2022) 101541, Feb. 7, 2022.
"Business Process Model and Notation," retrieved from <en.wikipedia.org/wiki/Business_Process_Model_and_Notation> on Mar. 23, 2023.
"Control-flow diagram," retrieved from < en.wikipedia.org/wiki/Control-flow_diagram> on Mar. 23, 2023.
"Data-flow diagram," retrieved from <en.wikipedia.org/wiki/Data-flow_diagram> on Mar. 23, 2023.
"Functional flow block diagram," retrieved from <en.wikipedia.org/wiki/Functional_flow_block_diagram> on Mar. 23, 2023.
"IDEF," retrieved from <en.wikipedia.org/wiki/IDEF> on Mar. 23, 2023.
"Kanban Board," retrieved from <en.wikipedia.org/wiki/Kanban_board> on Mar. 23, 2023.
"List of SysML tools," retrieved from <en.wikipedia.org/wiki/List_of_SysML_tools>.
"N2 chart," retrieved from <en.wikipedia.org/wiki/N2_chart> on Mar. 23, 2023.
"Value-stream mapping," retrieved from <en.wikipedia.org/wiki/Value-stream_mapping> on Mar. 23, 2023.
Abbott, B., Bapty, T., Biegl, C., Karsai, G., and Sztipanovits, J., "Model-based software synthesis," IEEE Software, vol. 10, pp. 42-52, 1993.
Academic, "Functional flow block diagram," retrieved from <en-academic.com/dic.nsf/enwiki/11327961> on Mar. 23, 2023.
Atluri, V., Rao, S., Sahni, S. "The trillion-dollar opportunity for the industrial sector: How to extract full value from technology," McKinsey Digital, 2018.
Bajaj, M., Hedburg, Jr., T. "System lifecycle handler-spinning a digital thread for manufacturing," 28th Annual INCOSE International Symposium, 2018.
Bloomberg, J., "Digitization, digitalization, and digital transformation: Confuse them at your peril," Forbes, 2018.
Bonnard, R., Hascoet, J., Mognol, P., Zancul, E., Alvares, A., "Hierarchical object-oriented model (HOOM) for additive manufacturing digital thread," Journal of Manufacturing Systems, vol. 50, pp. 36-52, 2019.
Booker, P., "A History of Engineering Drawing," Chatto Windus, 1963.
Busert, T., Fay, A., "Information quality focused value stream mapping for the coordination and control of production processes," International Journal of Production Research, vol. 59, No. 15, pp. 4559-4578, 2021.
Cann, O., "$100 trillion by 2025: the digital dividend for society and business," World Economic Forum, 2016.
Pelligatti, L., "SysML Distilled: A Brief Guide to the Systems Modeling Language," Addison Wesley and Pearson, 2013.
El-Sayed, M., "Value streaming through customer participation in product realization," SAE International Journal of Materials and Manufacturing, vol. 9, No. 3, 2016.
Embry, P., "Digital tapestry, lockheed martin space systems company," 2016, retrieved from <sma.nasa.gov/docs/default-source/News-Documents/embry_lockheed-martin-space-systems-digital-transformation.pdf?sfvrsn=95cae0f8_4> on Apr. 4, 2022.
Feng, S., Bernstein, W., Hedburg, Jr., T., Feeney, A., "Toward knowledge management for smart manufacturing," Journal of Computing and Information Science in Engineering, 2019.
Friedenthal, S., Moore, A., Steiner, R., "A Practical Guide to SySML, The Systems Modeling Language," Third Edition, Morgan Kaufmann and Elsevier, 2014.
Galati, F., Bigliardi, B., "Industry 4.0: Emerging themes and future research avenues using a text mining approach," Computers in Industry, vol. 109, pp. 100-113, 2019.
Geeks for Geeks, "Levels in Data Flow Diagram," Dec. 2, 2022, retrieved from <geeksforgeeks.org/levels-in-data-flow-diagrams-dfd> on Mar. 23, 2023.
Grant, M., "Gantt Charting: Definition, Benefits, and How They're Used," Dec. 01, 2022, retrieved from <www.investopedia.com/terms/g/gantt-chart.asp> on Mar. 23, 2023.
Hadavi, C., "The Metaverse Of Supply Chain Planning: Creating Virtual Supply Chains," Forbes, Jul. 12, 2022, retrieved from <www.forbes.com/sites/forbestechcouncil/2022/07/12/the-metaverse-of-supply-chain-planning-creating-virtual-supply-chains/?sh=73ab24152434> on Mar. 23, 2023.
Halton, C., "What is the Kanban System?," Sep. 28, 2022, retrieved from <www.investopedia.com/terms/k/kanban . asp> on Mar. 23, 2023.
Hardesty, L., "The birth of electrical engineering: The creation of the first electrical-engineering curriculum may have said as much about MIT's educational philosophy as it did about the pace of innovation," Mar. 9, 2011, retrieved from <news.mit.edu/2011/timeline-eecs-0309> on Apr. 4, 2022.
Harris, G. A., Abernathy, D., Lu, L., Hyre, A., Vinel, A., "Bringing clarity to issues with adoption of digital manufacturing capabilities: an analysis of multiple independent studies," Journal of the Knowledge Economy, 2021.
Harris, G., "Address to the general assembly of the Model Based Enterprise Summit," NIST Headquarters in Gaithersburg, MD, 2014.
Hasan, M., Starly, B., "Decentralized cloud manufacturing-as-a-service (CMAAS) platform architecture with configurable digital assets," Journal of Manufacturing Systems, vol. 56, pp. 157-174, 2020.
Hedburg, Jr., T., Hartman, N., Rosche, P., Fischer, K., "Identified research directions for using manufacturing knowledge earlier in the product life cycle," Internal Journal of Production Research, 2017.
Hedburg, Jr., T., Lubell, J., Fischer, L., Maggiano, L., Freeney, A., "Testing the digital thread in support of model-based manufacturing and inspection," Journal of Computing and Information Science in Engineering, vol. 16, 2016.
Helu, M., Hedburg, Jr., T., "Enabling smart manufacturing research and development using a product lifecycle test bed," Procedia Manufacturing, vol. 1, pp. 86-97, 2015.

(56) References Cited

OTHER PUBLICATIONS

Helu, M., Hedburg, Jr., T., Freeney, A., "Reference architecture to integrate heterogeneous manufacturing systems for the digital thread," CIRP Journal of Manufacturing Science and Technology, vol. 19, 2017.
Helu, M., Joseph, A., Hedburg, Jr., T., "A standards-based approach for linking as-planned to as-fabricated product data," CIRP Ann Manuf Technol. 2018, vol. 67, 2018.
Henry, T., Steiner, R., "Model-based systems engineering in the real world," Proceedings of the 9th Model-Based Enterprise Summit (MBE 2018), 2018.
Hessing, T., "History of Lean," retrieved from <sixsigmastudyguide.com/history-of-lean> on Mar. 23, 2023.
Hyre, A., Harris, G., Osho, J., Pantelidakis, M., Mykoniatis, K., and Liu, J., "Digital twins: Representation, replication, reality, and relational (4rs)," Manufacturing Letters, vol. 31, pp. 20-23, 2022.
IBM Cloud Education, "Structured vs. unstructured data: What's the difference?," retrieved from <www.ibm.com/cloud/blog/structured-vs-unstructured-data> on Jun. 18, 2022.
IEEE Computer Society, "IEEE Std 1233, 1998 edition, IEEE guide for developing system requirements specifications," tech. rep., IEEE Societies and the Standards Coordinating Committees of the IEEE Standards Association (IEEE-SA) Standards Board, 1998.
IEEE Computer Society, "IEEE Std 1362, 1998 edition, IEEE guide for information technology—system definition—concept of operations (conops) document," tech. rep., IEEE Societies and the Standards Coordinating Committees of the IEEE Standards Association (IEEE-SA) Standards Board, 1998.
IEEE Computer Society, "IEEE STD 15288-2008, systems and software engineering—system life cycle processes," tech. rep., ISO (International Organization for Standardization) and IEC (the International Electrotechnical Commission), 2008.
IEEE Computer Society, "IEEE-STD 1220-2005, IEEE standard for application and management of the systems engineering process," tech. rep., ISO (International Organization for Standardization) and IEC (the International Electrotechnical Commission), 2005.
Jackson, S., "Introducing systems engineering into a traditional commercial organization," INCOSE International Symposium, Jul. 1996.
Jeong, E., Jeong, D., Ha, S., "Dataflow model-based software synthesis framework for parallel and distributed embedded systems," ACM Transactions on Design Automation of Electronic Systems, vol. 26, pp. 1-38, 2021.
Kinard, D. A., "Digital thread and industry 4.0, NIST Model Based Enterprise conference," Mar. 2018, Retrieved from <www.nist.gov/system/files/documents/2018/04/09/2p_kinard_digitalthreadi4pt0.pdf > on Apr. 4, 2022.
Kinard, D. A., "F-35 digital thread and advanced manufacturing," AIAA Aviation Forum, 2018 Aviation Technology, Integration, and Operations Conference, 2018.
Kinard, D., "Digital thread and industry 4.0," NIST Model Based Enterprise Summit, 2017, retrieved from <www.internetofbusiness.com/wp-content/uploads/2017/12/Day-One_Lockheed-Martin.pdf> on Mar. 22, 2023.
Krima, S., Hedburg, Jr., T., Feeney, A., "Securing the digital threat for smart manufacturing: A reference model for blockchain-based product data traceability," NIST Advanced Manufacturing Series 300-6, 2019.
Kulvatunyou, B., Oh, H., Ivezic, N., Nieman, S., "Standards-based semantic integration of manufacturing information: Past, present, and future," Journal of Manufacturing Systems, vol. 52, pp. 184-197, 2019.
Kusiak, A., "Service manufacturing: Basic concepts and technologies," Journal of Manufacturing Systems, vol. 52, pp. 198-204, 2019.
Lu, Q., Botha, B., "Process development: a theoretical framework," International Journal of Production Research, vol. 44, No. 15, 2006.
Lubell, J., Kenway, C., Horst, J., Frechette, S., Huang, P., "NIST Technical Note 1753: Model Based Enterprise/Technical Data Package Summit Report," Aug. 2012.
Marr, B., "The 4th Industrial Revolution Is Here—Are You Ready?," Forbes, Aug. 13, 2018, retrieved from <www.forbes.com/sites/bernardmarr/2018/08/13/the-4th-industrial-revolution-is-here-are-you-ready/?sh=1733028d628b> on Mar. 23, 2023.
McDermott, T., Collopy, P., Nadolski, M., Paredis, C., "The future exchange of digital engineering data and models: an enterprise systems analysis," 17th Annual Conference on Systems Engineering Research (CSER), 2019.
McDermott, T., Collopy, P., Paredis, C., Nadolski, M., "Enterprise system-of-systems model for digital-thread enabled acquisition, technical report serc-2018-tr-109," tech. rep., Stevens Institute of Technology and Systems Engineering Research Center, 2018.
Mee, J., "Frederick W. Taylor: American inventor and engineer." Retrieved from <www.britannica.com/biography/Frederick-W-Taylor> on Apr. 14, 2022.
Mehler, J., McGee, S., Edson, R., "Leveraging systemigrams for conceptual analysis of complex systems: Application to the U.U. national security system," 8th Conference on Systems Engineering Research, (Hoboken, NJ), 2010.
Mies, D., Marsden, W., Warde, S., "Overview of additive manufacturing informatics: 'a digital thread'," Integrating Materials and Manufacturing Innovation, 2016.
National Institute of Standards and Technology, "Digital Thread for Smart Manufacturing," Apr. 25, 2014, retrieved from <www.nist.gov/programs-projects/digital-thread-smart-manufacturing> on Mar. 23, 2023.
National Institute of Standards and Technology, "Model-based Enterprise Summit 2019," retrieved from <www.nist.gov/news-events/events/2019/04/model-based-enterprise-summit-2019>.
New World Encyclopedia, "Flowchart," retrieved from <www.newworldencyclopedia.org/entry/Flowchart> on Mar. 23, 2023.
Norquist, D., "Dod digital modernization strategy, dod information resource management strategic plan FY19-23," Department of Defense Office of Prepublication and Security Review, 2019.
Object Management Group, "What is SysML?," retrieved from <www.omgsysml.org/what-is-sysml.htm> on Mar. 23, 2023.
Ohno, T., "Toyota production system: Beyond large-scale production," CRC Press 1988.
Oracle, "What is PLM (product lifecycle management)?," retrieved from <www.oracle.com/scm/product-lifecycle-management/what-is-plm/> on Apr. 4, 2022.
Osho, J., Hyre, A., Pantelidakis, M., Ledford, A., Harris, G., Liu, J., Mykoniatis, K., "Four RS framework for the development of a digital twin: The implementation of representation with a FDM manufacturing machine," Journal of Manufacturing Systems, vol. 63, pp. 370-380, 2022.
Piatt, J., "5 steps to improving profitability of high-mix/low-volume production," Industry Week, 2015.
Price, B., "Frank and Lillian Gilbreth and the Manufacture and Marketing of Motion Study" Business and Economic History, Second Series, vol. 18, 1908-1924, Cambridge University Press, 1989.
PTC, Inc., "PLM for engineering: Establish a foundation for the digital thread," retrieved from <www.ptc.com/en/technologies/plm/digital-thread/plm-engineering> on Apr. 4, 2022.
Roh, P., Kunz, A., Wegener, K., "Information stream mapping: Mapping, analysing and improving the efficiency of information streams in manufacturing value streams," CIRP Journal of Manufacturing Science and Technology, 2019.
Rother, M., Shook, J., "Learning to See: Value Stream Mapping to Create Value and Eliminate Muda," Lean Enterprise Institute, 2009.
Ruemler, S., Zimmerman, K., Hartman, N., Hedburg, Jr., T., Freeney, A., "Promoting model-based definition to establish a complete product definition," Journal of Manufacturing Science and Engineering, vol. 139, 2017.
Siebel, T.M., "Digital Transformation: Survive and Thrive in an Era of Mass Extinction." RosettaBooks, 2019.
Siemens, "Product lifecycle management (PLM) software," retrieved from <www.plm.automation.siemens.com/global/en/our-story/glossary/product-lifecycle-management-plm-software/12506> on Apr. 6, 2022.
Simko, G., Levendovsky, T., Neema, S., Jackson, E., Bapty, T., Porter, J., Sztipanovitz, J., "Foundation for model integration: Semantic backplane," Proceedings of the ASME 2012 International

(56) References Cited

OTHER PUBLICATIONS

Design Engineering Technical Conferences Computers and Information in Engineering Conference IDETC/CIE 2012, (Chicago, IL), 2012.

Solberg, A., "Model based systems engineering (MBSE)," retrieved from <www.nasa.gov/consortium/ModelBasedSystems> on Apr. 26, 2022.

Sturdevant, D., "(Still) learning from Toyota," 2014, retrieved from <www.mckinsey.com/industries/automotive-and-assembly/our-insights/still-learning-from-toyota> on Sep. 5, 2022.

sysml.org, "SysML Open Source Project: What is SysML? Who created SysML?," retrieved from <sysml.org> on Mar. 23, 2023.

Systems and P.E. Company, "The innoslate approach to digital engineering." retrieved from <specinnovations.com/wp-content/uploads/2019/05/DigitalEngineeringWhitepaper.pdf > on Apr. 15, 2022.

Sztipanovitz, J., Bapty, T., Koutsoukos, X., Lattmann, Z., Neema, S., Jackson, E., "Model and tool integration platforms for cyber-physical system design," Proceedings of the IEEE Special Issue on Design Automation for CPS, 2018 IEEE, 2018.

Toyota Blog, "Muda, muri, mura—toyota production system guide," 2013, retrieved from <mag.toyota.co.uk/muda-muri-mura-toyota-production-system/> on Sep. 6, 2022.

Von Rosing, M., White, S., Cummins, F., De Man, H., "Business Process Model and Notation—BPMN," The Complete Business Process Handbook: Body of Knowledge from Process Modeling to BPM, vol. 1, Elsevier, 2015.

Von Scheel, H., Von Rosing, M., Fonseca, M., Hove, M., Foldager, U., "Phase 1: Process Concept Evolution," The Complete Business Process Handbook: Body of Knowledge from Process Modeling to BPM, vol. 1, Elsevier, 2015.

Von Scheel, H., Von Rosing, M., Fonseca, M., Hove, M., Foldager, U., "Phase 2: Process Concept Evolution," The Complete Business Process Handbook: Body of Knowledge from Process Modeling to BPM, vol. 1, Elsevier, 2015.

Von Scheel, H., Von Rosing, M., Fonseca, M., Hove, M., Foldager, U., "Phase 3: Process Concept Evolution," The Complete Business Process Handbook: Body of Knowledge from Process Modeling to BPM, vol. 1, Elsevier, 2015.

Watts, M., "Tribal Knowledge," iSixSigma, Nov. 7, 2018, retrieved from < www.isixsigma.com/dictionary/tribal-knowledge/> on Mar. 23, 2023.

Wittekind, C., Harris, G., "Searching for the inscrutable: A search for clarity in digital manufacturing definitions, terminologies, and technologies," Institute of Industrial and Systems Engineers Annual Conference Proceedings, May 22-25, 2021, 2021.

Womack, J., "Value stream mapping: This lean tool can help companies level production, resulting in dramatic reductions in throughput time and costs, and improved quality," Society of Manufacturing Engineer's Manufacturing Engineering, 2006, retrieved from on Apr. 14, 2022.

Yarbrough, A., Harris, G., Purdy, G., "Improving the flow of data and information in manufacturing," Manufacturing Letters, vol. 32, pp. 1-4, 2021.

\* cited by examiner

600

```
┌─────────────────────────────────────────────────┐
│ Access a first data storage storing multiple function │
│  data objects and multiple data vessel data objects    │
│                       602                              │
└─────────────────────────────────────────────────┘
                         ↓
┌─────────────────────────────────────────────────┐
│  Iterate over the multiple data vessel data objects,   │
│  generating one or more data element instance data     │
│                     objects                            │
│                       604                              │
└─────────────────────────────────────────────────┘
                         ↓
┌─────────────────────────────────────────────────┐
│  Select a subset of the data element instance data     │
│   objects that include the same data element           │
│                    identifier                          │
│                       606                              │
└─────────────────────────────────────────────────┘
                         ↓
                ┌──────────────┐
                │  To FIG. 6B  │
                └──────────────┘
```

FIG. 6A

PHYSICAL COMPONENTS USING DATA ELEMENT MAPPING AND ANALYSIS

CROSS-REFERENCES TO RELATED APPLICATIONS

This application claims priority to U.S. Provisional Patent Application No. 63/290,805, entitled "DATA ELEMENT MAPPING AND ANALYSIS (DEMA)," filed Dec. 17, 2021, which is pending. The entirety of this application is incorporated by reference.

STATEMENT REGARDING FEDERALLY SPONSORED RESEARCH OR DEVELOPMENT

This invention was made with government support under W31P4Q-09-A-0016 awarded by the U.S. Department of the Army. The government has certain rights in the invention.

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE DISCLOSURE

The present disclosure generally relates to manufacturing physical components, and more particularly to improving physical components using data element mapping and analysis.

Physical components used in mechanical systems—whether military, industrial, aeronautical, or other fields—typically go through a lifecycle (or process) of four main parts: design, testing, and manufacturing, and use. Each of these parts can include various activities where information about the physical component is created or where such information is transmitted to another activity, either in the same part of the lifecycle or to a different part. As an example, a physical component's dimensions may be determined during the design part of the lifecycle and used during both the testing and manufacturing parts.

Often, the information about the physical component is not transmitted or stored in a digital format or the information is in an unstructured format and, thus, is not readily available to different functions during the physical component's lifecycle. In many component lifecycles, over 95% of data instances may be stored in non-digital data vessels, and over 50% may be unstructured. Continuing the above example, the physical component's dimensions may be written down by an engineer on a notepad, and the engineer may have a conversation with a part manufacturer to tell the manufacturer what the component's dimensions are. Transmitting certain pieces of information during different activities of the lifecycle where such information was not previously transmitted can improve the physical component, especially where such connection is a digital connection. Similarly, removing the transmission of information between certain activities when such information is not needed can make the process of designing, testing, or fabricating the physical component more efficient. Lastly, using information from a later part of the physical component's lifecycle in a previous part (e.g., using information created during testing part of the lifecycle in the design part) can also improve later iterations of the physical component.

Currently, systems and methods for designing and manufacturing physical components do not attempt to digitize the information about the physical component, nor do such systems and methods attempt to improve the lifecycle of the component. Even if these systems and methods do try to improve the lifecycle, they do it through inefficient human examination of the lifecycle and through trial and error.

What is needed, then, are systems, apparatuses, devices, and methods for improving physical components using data element mapping and analysis.

BRIEF SUMMARY

This Brief Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

One aspect of the disclosure is a system. The system may include a system for improving a physical component. The system may include a computer processor and a non-transitory computer-readable storage medium that stores executable instructions thereon. The computer processor may be configured, in response to executing the executable instructions, to perform one or more steps. The steps may include accessing a first data storage. The first data storage may include a plurality of function data objects. Each function data object may include a reference to one or more data vessel data objects. The first data storage may include a plurality of data vessel data objects. Each data vessel data object may include a reference to one or more function data objects of the plurality of function data objects. The steps may include iterating over the plurality of data vessel data objects, and for each data vessel data object, generating one or more data element instance data objects. Each data element instance data object may include a data element identifier and one or more references to one or more other data element instance data objects. The one or more data element instance data objects generated from the iteration over the plurality of data vessel data objects may form a plurality of data element instance data objects. The one or more steps may include selecting a subset of the plurality of data element instance data objects that include the same data element identifier. The one or more steps may include ordering the subset of the data element instance data objects based their respective one or more references to one or more other data element instance data objects. The one or more steps may include storing the ordered subset of the data element instance data objects in a second data storage as a digital thread.

The system may improve a physical component or may improve the process of designing, fabricating, and testing the physical component. Improving the process of designing, fabricating, and testing may include digitally connecting the data element instances corresponding to the data element instance data objects. Digital connectivity can improve the lifecycle of the component by unsiloing the data element from a siloed data vessel, making the data element more trackable, improving the speed at which the data element is transferred between functions, and removing human error. The system may be further configured to remove one or more data element instance data objects if it is determined that the data element instances corresponding to such data element instance data objects are not needed. The system may also be further configured to add one or more additional data element instance data objects if it is determined that the data element is needed at some function it currently is not sent to. The system may also be further configured to connect a later data element instance data object to an early data element instance data object in order to update the data element and manufacture a new iteration of the physical component based on the updated data element. In some embodiments, the improvements may be in response to determining data flows that are not widely known and using such data more efficiently and among a wider area of an organization.

Numerous other objects, advantages and features of the present disclosure will be readily apparent to those of skill in the art upon a review of the following drawings and description of various embodiments.

BRIEF DESCRIPTION OF THE DRAWINGS

FIG. 6A is a flowchart illustrating one embodiment of a method for improving physical components using data element mapping and analysis.

DETAILED DESCRIPTION

Figure 1:
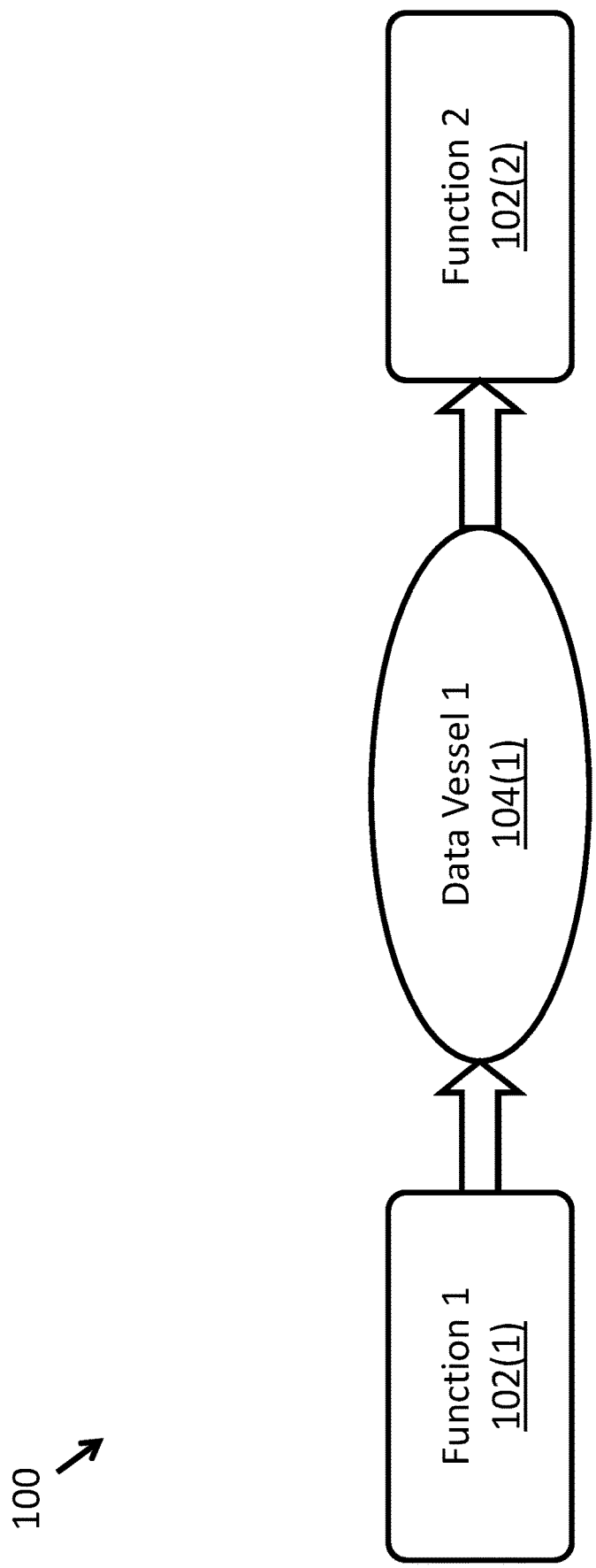
FIG. 1 is a flow diagram illustrating one embodiment of a system for improving physical components using data element mapping and analysis.

While the making and using of various embodiments of the present disclosure are discussed in detail below, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatus and methods described herein. Such equivalents are considered to be within the scope of this disclosure and are covered by the claims.

Reference throughout this specification to "one embodiment," "an embodiment," "another embodiment," or similar language means that a particular feature, structure, or characteristic described in connection with the embodiment is included in at least one embodiment. Thus, appearances of the phrases "in one embodiment," "in an embodiment," "in some embodiments," and similar language throughout this specification may, but do not necessarily, all refer to the same embodiment, but mean "one or more but not necessarily all embodiments" unless expressly specified otherwise.

The terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. As used herein, the term "a," "an," or "the" means "one or more" unless otherwise specified. The term "or" means "and/or" unless otherwise specified.

Multiple elements of the same or a similar type may be referred to as "Elements 102(1)-(n)" where n may include a number. Referring to one of the elements as "Element 102" refers to any single element of the Elements 102(1)-(n). Additionally, referring to different elements "First Elements 102(1)-(n)" and "Second Elements 104(1)-(n)" does not necessarily mean that there must be the same number of First Elements as Second Elements and is equivalent to "First Elements 102(1)-(n)" and "Second Elements (1)-(m)" where m is a number that may be the same or may be a different number than n.

As used herein, the term "computing device" may include a desktop computer, a laptop computer, a tablet computer, a mobile device such as a mobile phone or a smart phone, a smartwatch, a gaming console, an application server, a database server, or some other type of computing device. A computing device may include a physical computing device or may include a virtual machine (VM) executing on another computing device. A computing device may include a cloud computing system, a distributed computing system, or another type of multi-device system.

As used herein, the term "data network" may include a local area network (LAN), wide area network (WAN), the Internet, or some other network. A data network may include one or more routers, switches, repeaters, hubs, cables, or other data communication components. A data network may include a wired connection or a wireless connection.

As used herein, the term "computing platform" or "platform" may include a computing environment where a portion of software can execute. A computing platform may include hardware on which the software may execute. The computing platform may include an operating system. The computing platform may include one or more software applications, scripts, functions, or other software. The computing platform may include one or more application programming interfaces (APIs) by which different portions of the software of the platform may communicate with each other or invoke functions. The computing platform may include one or more APIs by which it may communicate with external software applications or by which external software applications may interact with the platform. The computing platform may include a software framework. The computing platform may include one or more VMs. The software platform may include one or more data storages. The software platform may include a client application that executes on an external computing device and that interacts with the platform in a client-server architecture.

As used herein, the term "data storage" may include a physical medium or a software medium. A physical medium data storage may include a computer-readable storage medium. A software medium data storage may include a file system, a database, or some other type of software method of storing data. In some embodiments, a physical medium data storage may store one or more software medium data storages.

As used herein, the terms "determine" or "determining" may include a variety of actions. For example, "determining" may include calculating, computing, processing, deriving, looking up (e.g., looking up in a table, a database or another data structure), ascertaining, or other actions. Also, "determining" may include receiving (e.g., receiving information or data), accessing (e.g., accessing data in a memory, data storage, distributed ledger, or over a network), or other actions. Also, "determining" may include resolving, selecting, choosing, establishing, or other similar actions.

As used herein, the terms "provide" or "providing" may include a variety of actions. For example, "providing" may include generating data, storing data in a location for later retrieval, transmitting data directly to a recipient, transmitting or storing a reference to data, or other actions. "Providing" may also include encoding, decoding, encrypting, decrypting, validating, verifying, or other actions.

As used herein, the term "access," "accessing", and other similar terms may include a variety of actions. For example, accessing data may include obtaining the data, examining the data, or retrieving the data. Providing access or providing data access may include providing confidentiality, integrity, or availability regarding the data.

As used herein, the term "message" may include one or more formats for communicating (e.g., transmitting or receiving) information or data. A message may include a machine-readable collection of information such as an Extensible Markup Language (XML) document, fixed-field message, comma-separated message, or another format. A message may, in some implementations, include a signal utilized to transmit one or more representations of information or data.

As used herein, the term "user interface" (also referred to as an interactive user interface, a graphical user interface or a UI), may refer to a computer-provided interface including data fields or other controls for receiving input signals or providing electronic information or for providing information to a user in response to received input signals. A user interface may be implemented, in whole or in part, using technologies such as hyper-text mark-up language (HTML), a programming language, web services, or rich site summary (RSS). In some implementations, a user interface may be included in a stand-alone client software application configured to communicate in accordance with one or more of the aspects described.

As used herein, the term "modify" or "modifying" may include several actions. For example, modifying data may include adding additional data or changing the already-existing data. As used herein, the term "obtain" or "obtaining" may also include several types of action. For example, obtaining data may include receiving data, generating data, designating data as a logical object, or other actions.

As used herein, the term "data object" may include a logical container for data. A data object may include an instance of an object in a software application implemented with an object-oriented programming language. A data object may include data formatted in an electronic data interchange (EDI) format, such as an extensible Markup Language (XML) object, a JavaScript Object Notation (JSON) object, or some other EDI-formatted object. A data object may include one or more functions that may manipulate the data of the data object. For example, a data object may include the functions or methods of an object in a software application implemented with an object-oriented programming language.

As used herein, the term "physical component" may include a physical element or sub-component of a machine or other apparatus. A physical component may include multiple sub-components, and the term "physical component" may be equally applicable to a sub-component unless otherwise specified.

As used herein, many occurrences of "function" may include function represented by a block in a functional block diagram (FBD), a functional flow block diagram (FFBD), or some other similar flow diagram. A function may include a finite, discrete action to be accomplished by a system's elements. A function may include an iterative action with one or more specific exit criteria that may end the function. A function may include a high-level function, a sub-function, or some other type of function applicable to a visual mapping diagram. A function may include one or more inputs. An input may include the output of another function, a piece of data, an action, or some other information that can serve as the input to a function. A function may include one or more outputs. An output may include a data element (described below), an action, or some other information sent from the function. The output may act as the input to one or more other functions.

As used herein, a "data vessel" may include a container of data. A data vessel may take on a variety of forms, including a document (including a physical paper document or a file on a computer), email, notes (either on paper or in a file on a computer), drawings, computer-assisted drawing (CAD) files, or other types of data containers. A data vessel may include a digital data vessel. A digital data vessel may include a data vessel that stores data in a predetermined format. The predetermined format may include storage in a database, a computer file of a certain file format, a Product Lifecycle Management (PLM) software system, or some other format. Examples of a data vessel that is not a digital data vessel may include a physical paper file, paper notes, a vocal conversation, or some other data vessel format.

As used herein, a "data element" may include a discrete piece of information. Examples of a data element include the name of a physical component, the physical location of a physical component, the dimensions of a component, or other information about a component. In some embodiments, a data element may include data indirectly related to the physical component, such as a project due date, material costs, a meeting date or time, or other lifecycle data. The term "data element instance" may include a specific occurrence of a data element, and the data element may appear in multiple occurrences simultaneously. A data element instance may be stored or otherwise included in a data vessel. As an example, a data element may include the dimensions of the physical component, and multiple instances of the dimensions may be present in an email data vessel and a database data vessel.

As a general overview, the disclosure is directed to systems and methods for improving a physical component. A system may improve the physical component by improving the data flows of the system where such data flows are related to the design, testing, or manufacturing of the physical component. Improving the data flows may include making such data flows more efficient, more economical, or faster. Improving the data flow may include sending data elements digitally instead of manually by creating digital connections between data vessels. Improving data flows may include removing data element instances from the data flow where such data element instances are not needed, or may include adding data element instances and connecting them where they are needed. Improving the physical component may include adjusting the component based on data derived from further down the data flow.

The system may capture functions, data vessels, or connections between functions or data vessels that describe the process of designing, testing, and manufacturing the physical component and how different data elements may flow through these functions. The system may generate or store data objects corresponding to these functions, data vessels, or connections. The system may then generate-based on the function, data vessel, or connection data objects-data element instance data objects. Multiple data element instance objects may correspond to a data element and may show how the data element flows through various functions or data vessels during the process.

The system may select a subset of the data element instance objects that correspond to a certain data element. The system may order the subset of data element instance data objects based on the movement of the data element between functions via data vessels (which information may come from the function or data vessel data objects). If the data element is stored on a non-digital data vessel at a certain point in the process, a data vessel data object, a data element instance data object, or some other data object or data may indicate such non-digital data vessel storage.

The system may generate a visual representation of the subset of data element instance data objects, which may include a visual representation about how the corresponding data element may flow through the lifecycle. A user may review this visual representation and improve the process by causing the data element to be stored in a digital data vessel instead of a non-digital data vessel. The user may also review the visual representation, determine where the data element unnecessarily flows through a function, and remove the data element from that function. The user may review the visual representation, determine that the data element should flow through a function the data element currently does not, and connect the data element to that function.

Further details regarding the systems and methods of the disclosure are now provided. A first data storage of the system may store one or more function data objects or one or more data vessel data objects. FIG. 1 depicts a visual representation of a system 100 that includes function data objects 102(1)-(2) and a data vessel data object 104(1). As can be seen from FIG. 1, the first function data object 102(1) may connect to the data vessel data object 104(1). The data vessel data object 104(1) may, in turn, connect to the second function data object 102(2). Thus, the system 100 of FIG. 1 may represent that a data element flows from a first function (corresponding to the first function data object 102(1)) to a second function (corresponding to the second function data object 102(2)) and that the data element is stored in a data vessel (corresponding to the data vessel data object 104(1)) during the flow.

In one embodiment, each function data object 102 may correspond to a function in a visual mapping diagram. A visual mapping diagram may include a FBD, FFBD, an Icam DEFinition for Function Modeling (IDFO) diagram, a DeMarco data flow diagram, or some other visual mapping diagram. In some embodiments, each data vessel data object 104 may correspond to a data vessel. The corresponding data vessel data object 104 may include a digital format indicator, which may include data indicating whether the corresponding data vessel is a digital data vessel.

In one embodiment, a function data object 102(1) or a data vessel data object 104(1) may include data referencing another function data object 102(2) or another data vessel data object 104(2). The data referencing another function data object 102(2) or data vessel data object 104(2) may indicate that the function corresponding to the function data object 102(1) or the data vessel corresponding to the data vessel data object 104(1) may send a data element to another function (corresponding to the other function data object 102(2)) or another data vessel (corresponding to the other data vessel data object 104(2)). In some embodiments, data referencing data may include an identifier of the other function data object 102(2) or data vessel 104(2), a logical pointer (e.g., a pointer in an object-oriented programming language), or some other type of data capable of referencing the other function data object 102(2) or data vessel 104(2).

As an example, a design engineer, as part of a design development function, may determine the dimensions of the physical component. The design engineer may then email the dimensions to a manufacturing engineer. The manufacturing engineer, as part of a testing function, may produce a sample of the physical component using the dimensions. In this example, the design development function and the testing function are functions, the email is a data vessel, and the dimensions of the physical component are the data element. The inclusion of the dimensions in the email by the design engineer may include a connection from the design development function to the email data vessel, and the use of the dimensions from the email in the testing function may include a connection from the email data vessel to the testing function.

Continuing the example, a first data storage may store a design development function data object 102(1), a testing function data object 102(2), and an email data vessel data object 104. The design development function data object 102(1) may correspond with the design development function. The testing function data object 102(2) may correspond with the testing function. The email data vessel data object 104 may correspond with the email. The design development function data object 102(1) may include data referencing the email data vessel data object 104, which may correspond to the dimensions being sent via an email as part of the design development function. The email data vessel data object 104 may include data referencing the testing function data object 102(2), which may correspond to the dimensions being retrieved from the email as part of the testing function.

In some embodiments, the system 100 may include any number of function data objects 102, data vessel data objects 104, or connections between such data objects 102, 104. For example, a system 100 may include 1-10 function data objects 102, 11-100 function data objects 102, 101-500 function data objects 102, 501-1000 function data objects 102, 1001-2000 function data objects 102, or over 2001 function data objects 102. The system 100 may include 1-10 data vessel data objects 102, 11-100 data vessel data objects 102, 101-500 data vessel data objects 102, 501-1000 data vessel data objects 102, 1001-2000 data vessel data objects 102, or over 2001 data vessel data objects 102.

Furthermore, in some embodiments, a single function data object 102 may include multiple references to different data vessel data objects 104. This may correspond to (1) a single function sending the same data element to multiple different data vessels, (2) a single function sending different data elements to multiple different data vessels, or (3) a combination of the two. Similarly, a single data vessel may include multiple references to different function data objects 102, which may correspond to (1) a single data vessel sending the same data element to multiple different functions, (2) a single data vessel sending different data elements to multiple different functions, or (3) a combination of the two. In certain embodiments, a single function data object 102 may include multiple references to the same data vessel data object 104, which may correspond to a single function sending different data elements to the same data vessel. Similarly, a single data vessel data object 104 may include multiple references to the same function data object 102, which may correspond to a single data vessel sending different data elements to the same function.

Figure 2:
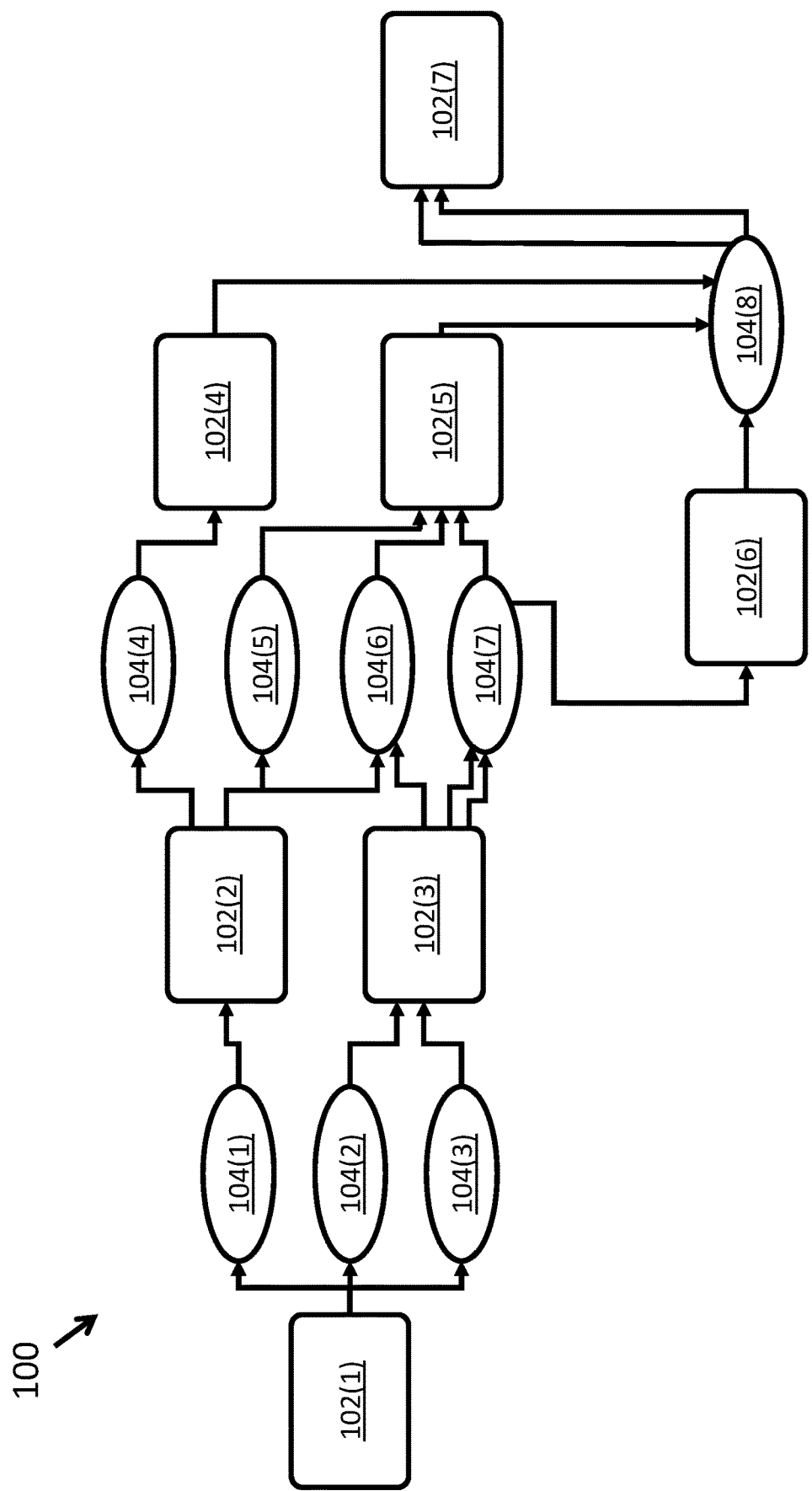
FIG. 2 is a flow diagram illustrating one embodiment of a system for improving physical components using data element mapping and analysis.

FIG. 2 depicts one example of a system 100 more complex than that of FIG. 1. As can be seen from FIG. 2, the system 100 may include multiple function data objects 102(1)-(7), multiple data vessel data objects 104(1)-(8), and the data objects 102, 104 being connected via the various reference data. As also can be seen from FIG. 2, a single connection may connect from a single function data object 102 to multiple data vessel data objects 104 (e.g., the connection from function data object 102(1) to data vessel data objects 104(1)-(3)). This may represent the same data element being sent to different data vessels. Multiple connections may exist from a single function data object 102 to a single data vessel object 104 (e.g., the connections from function data object 102(3) to data vessel data object 104(7)). This may represent different data elements being sent from the same function with the same data vessel. Similar connections may occur from data vessel data objects 104 to function data objects 102.

Figure 3:
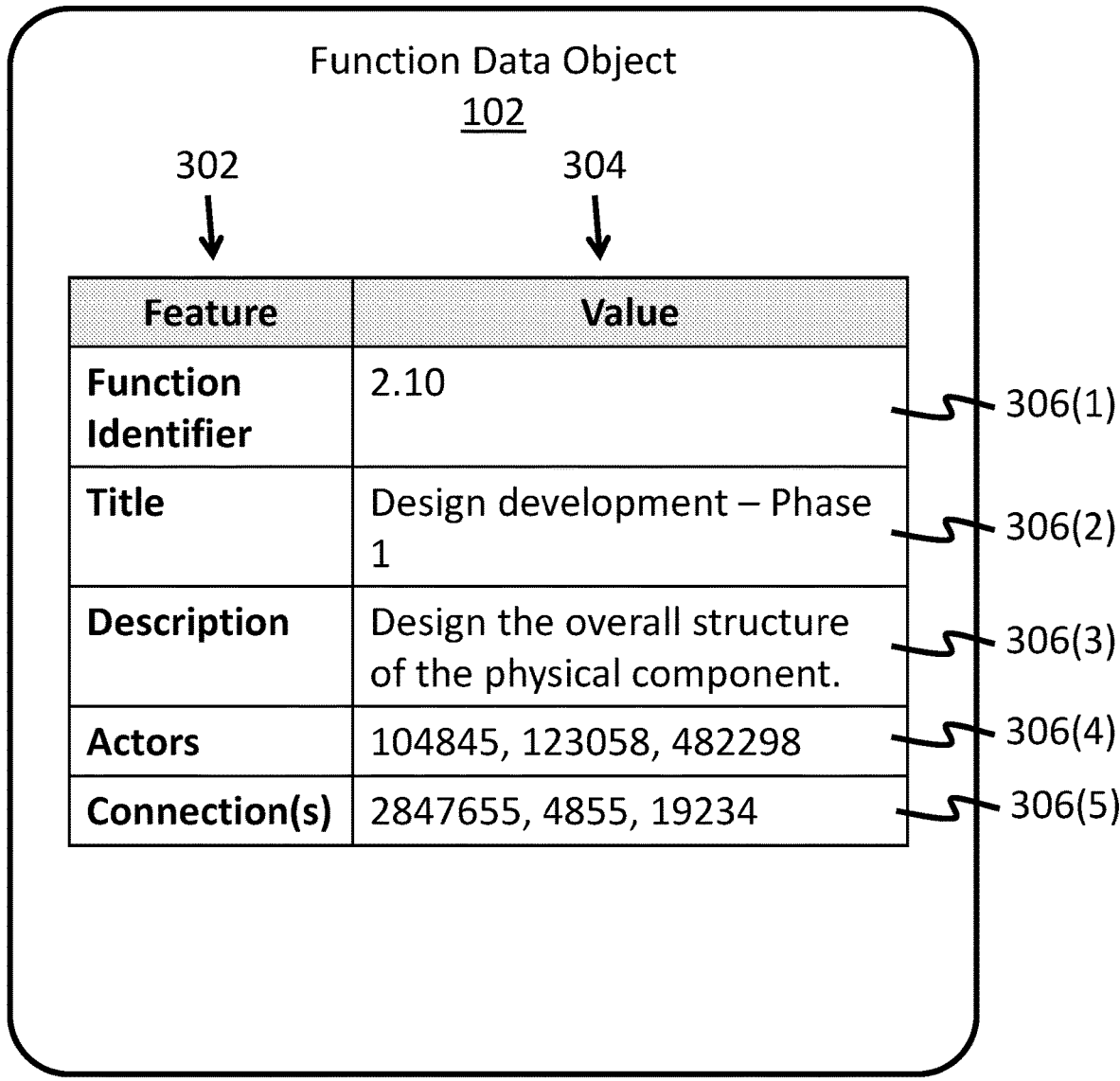
FIG. 3 is a block diagram illustrating one embodiment of a function data object for systems and methods for improving physical components using data element mapping and analysis.

Further details regarding each of the function data objects 102 and data vessel data objects 104 are now discussed. FIG. 3 depicts one embodiment of a function data object 102. As discussed above, a function data object 102 may correspond with a function in a FBD, FFBD, or some other type of visual mapping. The function data object 102 may include one or more features 302 and their corresponding values 304. A feature 302 may include data associated with the function data object 102.

As can be seen from FIG. 3, a function data object 102 may include a function identifier 306(1). The function identifier 306(1) may include a value 304 that uniquely identifies the function from all other functions in the process for the physical component. The function identifier 306(1) may include a number, a text string, or some other type of data. The function data object 102 may include a title 306(2). The title 306(2) may include a value 304 that provides the title of the function that corresponds to the function data object 102. The title 306(2) may include a text string or some other type of data.

In one embodiment, the function data object 102 may include a description 306(3). The description 306(3) may include a value 304 that describes the function that corresponds to the function data object 102. The description 306(3) may include a text string or some other type of data. The function data object 102 may include one or more actors 306(4). The actors 306(4) may include one or more values 304 that identify a person, organization, computer system, or other entity (afterward, called an "actor") that may provide some kind of action related to the function that corresponds to the function data object 102. An actor may provide input to the function, perform one or more actions as part of the function, or perform other actions related to the function. The values 304 of the actors 306(4) may include identifying numbers (e.g., as depicted in FIG. 3), the actors' names, or some other type of information that can identify the actors.

In some embodiments, the function data object 102 may include one or more references to one or more data vessel data objects. The one or more references may include one or more connections 306(5). The connections 306(5) may include one or more values 304 that identify one or more data vessel data objects 104 that correspond to data vessels to which the corresponding function sends one or more data elements. The values 304 of the connections 306(5) may include numbers, text strings, or other data that identify the connected data vessel data objects 104 (e.g., the data vessel identifier 402(1), discussed below).

Figure 4:
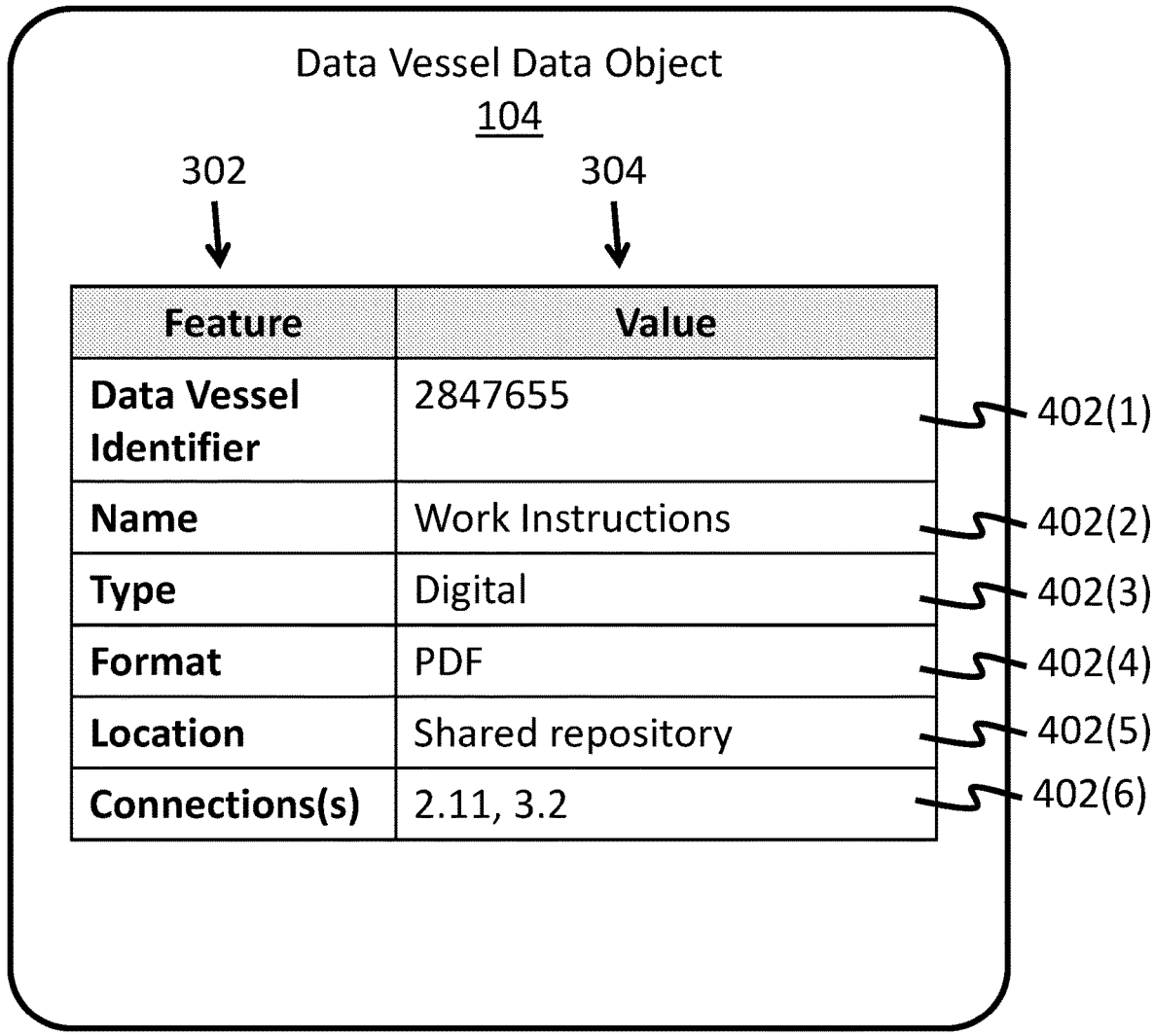
FIG. 4 is a block diagram illustrating one embodiment of a data vessel data object for systems and methods for improving physical components using data element mapping and analysis.

FIG. 4 depicts one embodiment of a data vessel data object 104. As discussed above, a data vessel data object 104 may correspond with a data vessel in a data vessel mapping or some other type of visual mapping. The data vessel data object 104 may include one or more features 302 and their corresponding values 304. A feature 302 may include data associated with the data vessel data object 104.

In some embodiments, the data vessel data object 104 may include a data vessel identifier 402(1). The data vessel identifier 402(1) may include a feature 302 whose value 304 uniquely identifies the data vessel among the data vessels related to the process for the physical component. The data vessel identifier 402(1) may include a number, a text string, or some other type of data. The data vessel data object 104 may include a name 402(2). The name 402(2) may include a feature 302 whose value 304 provides the name of the corresponding data vessel. The name 402(2) may include a number, text string, or some other type of data. The name 402(2) may include a filename, the name of a physical document, the name of a database or portion of a database, the subject line of an email, a description of the data vessel (e.g., "personal notes taken by engineer," "conversation between engineer and tester," etc.), or some other name-related data.

In one embodiment, the data vessel data object 104 may include a type 402(3). The type 402(3) may include a feature 302 whose value 304 identifies whether the corresponding data vessel is a digital data vessel. The type 402(3) may include a Boolean (e.g., "True" indicates that data vessel is a digital data vessel and "False" indicates that the data vessel is not a digital data vessel), a number (e.g., "1" indicates that data vessel is a digital data vessel and "0" indicates that the data vessel is not a digital data vessel), a text string, or some other data. The data vessel data object 104 may include a format 402(4). The format 402(4) may include a feature 302 whose value 304 provides the format that the corresponding data vessel is in. The format 402(4) may include a number, text string, or some other data. The format 402(4) may include a file type (e.g., Portable Document Format (PDF), a Microsoft Word document, an email file, a CAD file, an image file, etc.). The format 402(4) may include data indicating a paper document, a visual observation, a verbal conversation, or some other format that the corresponding data vessel may be in. The data vessel data object 104 may include a location 402(5). The location 402(5) may include a feature 302 whose value 304 may identify the location of the corresponding data vessel. The location 402(5) may include a number, text string, or other data. The location 402(5) may include a pathname (e.g., if the data vessel is a computer file), a uniform resource identifier (URI) or uniform resource location (URL) (e.g., if the data vessel is located on another device or on the Internet). The location 402(5) may include an email directory, a shared repository, a database, physical storage, or some other location.

In some embodiments, the data vessel data object 104 may include one or more references to one or more function data objects 102. The references may include one or more connections 402(6). The connections 402(6) may include one or more values 304 that identify one or more function data objects 102 that correspond to functions to which the corresponding data vessel sends one or more data elements. The values 304 of the connections 402(6) may include numbers, text strings, or other data that identify the connected function data objects 102 (e.g., the function identifier 306(1), discussed above).

In some embodiments, the one or more references to one or more data vessel data objects 104 or function data objects (e.g., the connections 306(5) of the function data object 102 or the connections 402(6) of the data vessel data object 104) may include a connection data object. The connection data object may include a data object that corresponds to a connection between a function and a data vessel. Thus, in some embodiments, instead of including references to function data objects 102 or data vessel data objects 104 directly in the connections 306(5), 402(6), the function data objects 102 and data vessel data objects 104 may include references to connection data objects, which in turn, may reference the connecting function data object(s) 102 or data vessel data object(s) 104.

Figure 5:
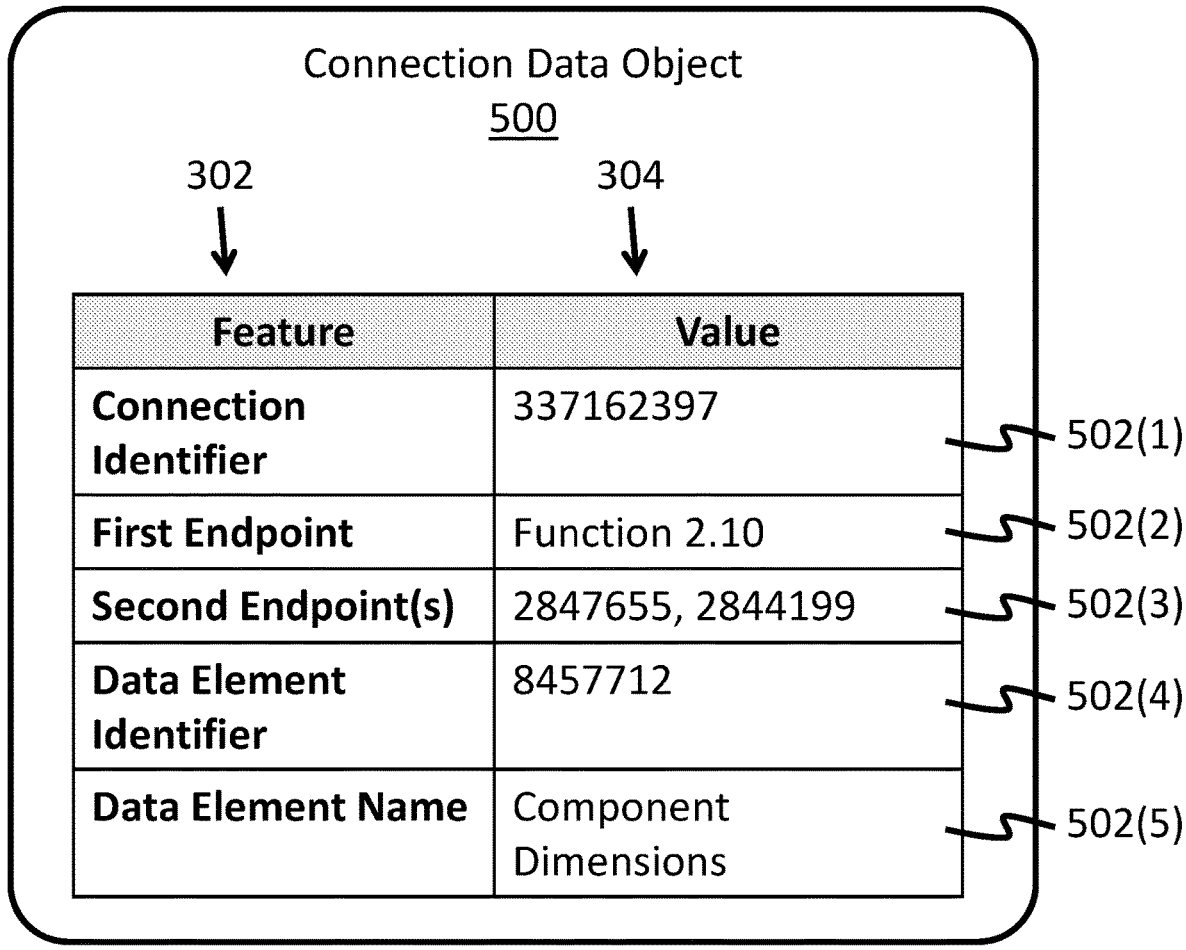
FIG. 5 is a block diagram illustrating one embodiment of a connection data object for systems and methods for improving physical components using data element mapping and analysis.

FIG. 5 depicts one embodiment of a connection data object 500. The connection data object 500 may include one or more features 302 and their corresponding values 304. A feature 302 may include data associated with the connection data object 500. In some embodiments, the connection data object 500 may include a connection identifier 502(1). The connection identifier 502(1) may include a feature 302 whose value 304 uniquely identifies the connection data object 500 among the connection data objects 500 associated with the process for the physical component. The connection identifier 502(1) may include a number, text string, or other data. The connections 306(5), 402(6) of a function data object 102 or data vessel data object 104 may include a connection identifier 502(1).

In certain embodiments, the connection data object 500 may include a first endpoint 502(2). The first endpoint 502(2) may include data indicating a function data object 102 or a data vessel data object 104 that corresponds to the function or data vessel that is the first endpoint of the corresponding connection. The first endpoint 502(2) may include a function identifier 306(1), a data vessel identifier 402(1), or other data that can identify the connecting function data object 102 or data vessel data object 104. The first endpoint 502(2) may identify the function or data vessel from which the data element travels.

In some embodiments, the connection data object 500 may include one or more second endpoints 502(3). The one or more second endpoints 502(3) may include data indicating a function data object 102 or a data vessel data object 104 that corresponds to the function or data vessel that is the second endpoint of the corresponding connection. The second endpoint 502(3) may include a function identifier 306(1), a data vessel identifier 402(1), or other data that can identify the connecting function data object 102 or data vessel data object 104. The second endpoint 502(3) may identify the function or data vessel to which the data element travels. As can be seen from FIG. 5, in some embodiments, a connection data object 500 may have multiple second endpoints 502(3), which may indicate that the same piece of data is sent to multiple functions or data vessels. Similarly (although not shown in FIG. 5), in one embodiment, a connection data object 500 may have multiple first endpoints 502(2), which may indicate that the same piece of data is sent from multiple functions or data vessels.

The connection data object 500 may include a data element identifier 502(4). In some embodiments, a connection data object 500 may correspond to a certain data element moving from one function to another through a data vessel. This data element can be identified via the data element identifier 502(4) of a connection data object 500. Multiple connection data objects 500 may include the same data element identifier 502(4), which may indicate that the same data element is present in different functions or data vessels throughout the process for the physical component. In some embodiments, the data element identifier 502(4) may include a number, a text string, or other data. The connection data object 500 may include a data element name 502(5). The data element name 502(5) may include a name of the data element identified by the data element identifier 502(4). The data element name 502(5) may include a number, a text string, or other data.

In one embodiment, a function data object 102 may correspond to a sensor of a manufacturing system for the physical component sensing a physical phenomenon related to the manufacturing of the physical component. The sensor may generate an output signal based on the sensed phenomenon. A data element may include the output signal. The output signal may include data related to the physical component. The sensor may send the output signal data element to a data vessel. Another function may use the output signal data element.

Figure 6B:
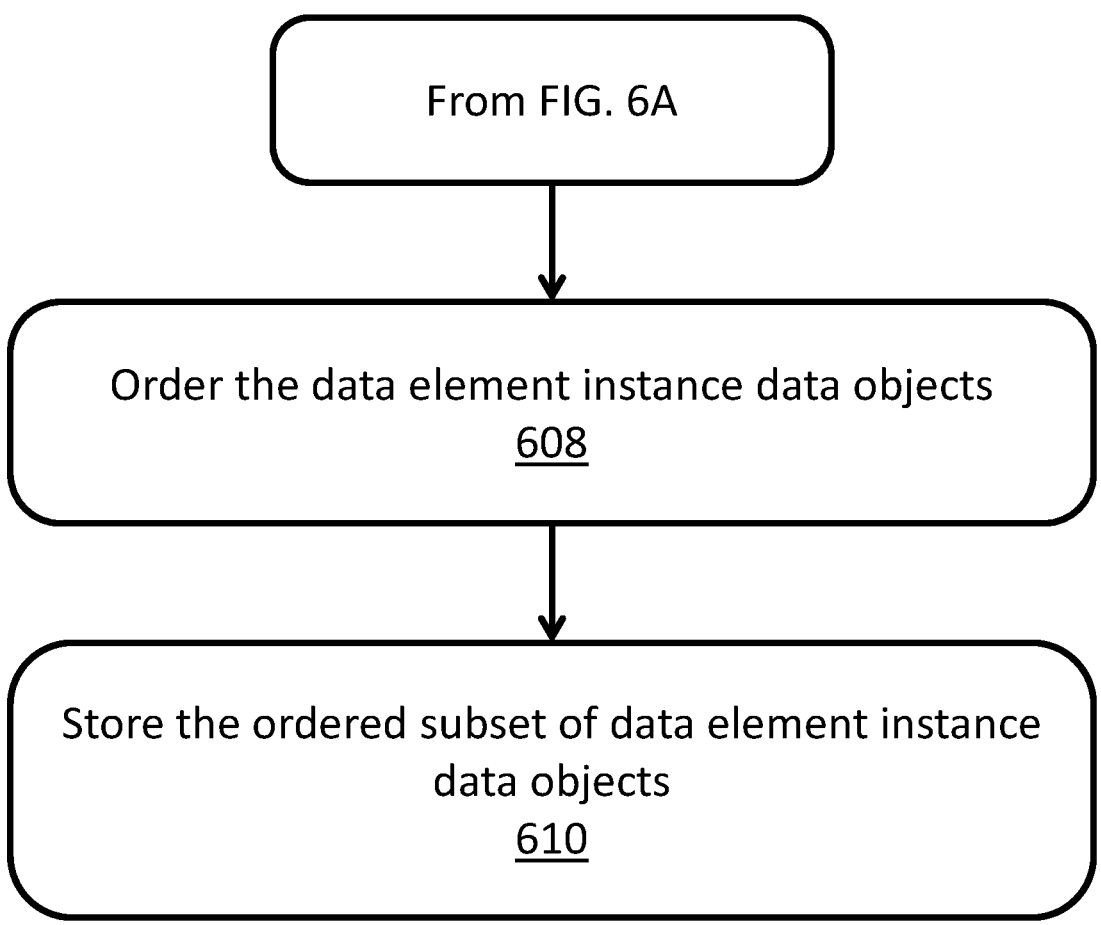
FIG. 6B is a flowchart illustrating a continuation of the method of FIG. 6A.

FIGS. 6A-B depict one embodiment of a method 600. The method 600 may include a method for improving physical components using data element mapping and analysis. The method 600 may include accessing a first data storage that stores multiple function data objects 102 and multiple data vessel data objects 104 (step 602). The method 600 may include iterating over the multiple data vessel data objects 104 and, for each data vessel data object, generating one or more data element instance data objects (step 604). The method 600 may include selecting a subset of the data element instance data objects where the subset of data element instance data objects all include the same data element identifier (step 606). The method 600 may include ordering the data element data objects (step 608). The ordering may be based on the data element data objects' respective references to one or more other data element instance data objects. The method 600 may include storing the data element data objects in a second data storage (step 610).

Further details regarding the method 600 are now disclosed. Accessing the first data storage (step 602) may include accessing function data objects 102, data vessel data objects 104, or connection data objects 500 already in existence and already connected as discussed above in relation to FIGS. 1-5.

In one embodiment, iterating over the multiple data vessel data objects 104 (step 604) may include selecting each data vessel data object 104 one at a time. The data vessel data objects 104 may be selected in any order. During the iteration, for each data vessel data object 104, the system may generate one or more data element instance data objects. Each data element data instance data object may correspond with an instance of a data element that is stored by the current data vessel.

Figure 7:
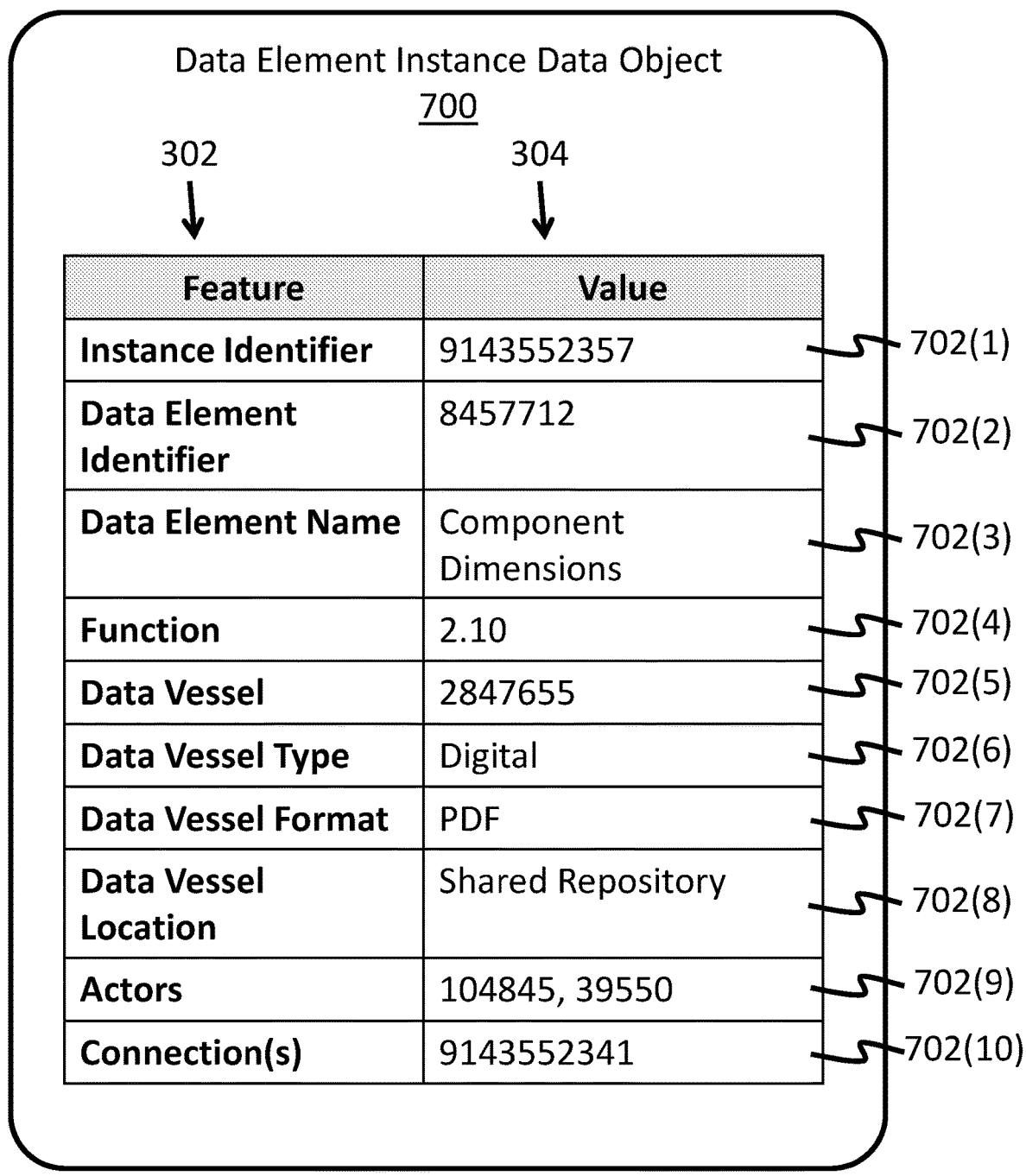
FIG. 7 is a block diagram illustrating one embodiment of a data element instance data object for systems and methods for improving physical components using data element mapping and analysis.

FIG. 7 depicts one embodiment of a data element instance data object 700. The data element instance data object 700 may include one or more features 302 and their corresponding values 304. A feature 302 may include data associated with the data element instance data object 700.

In one embodiment, the data element instance data object 700 may include an instance identifier 702(1). The instance identifier 702(1) may uniquely identify the data element instance data object 700 from all other data element instance data objects 700 of the process. The instance identifier 702(1) may include a number, a text string, or other data format. The data element instance data object 700 may include a data element identifier 702(2). The data element identifier 702(2) may identify the data element associated with the data element instance data object 700. The same data element may be stored in different data vessels during the process. Each instance of that data element may generate a different data element instance. Thus, the collection of all of the data element instances pertaining to the same data element may show the flow of the data element through various data vessels during the process. Thus, the data element identifier 702(2) may identify the data element. The data element identifier 702(2) may include a number, a text string, or some other data format.

In some embodiments, the data element instance data object may include a data element name 702(3). The data element name 702(3) may include the name of the data element identified by data element identifier 702(2). The data element name 702(3) may include a text string or some other data format. The data element instance data object 700 may include a reference to a function 702(4). The function reference 702(4) may include a reference to a function data object 102. The function data object 102 may correspond to the function from which the data element was sent to the data vessel that corresponds to the data vessel data object 104 currently selected in the iteration step. For example, in FIG. 2, if the data vessel data object 104(1) is currently selected in the iteration step, then the function data object 102(1) (corresponding to the function that sent the data element to the data vessel corresponding to data vessel data object 104(1)) may be the function reference 702(4). The function reference 702(4) may include a function identifier 306(1). The function reference 702(4) may include a number, text string, logical connector, or some other data format.

The data element instance data object 700 may include a reference to a data vessel 702(5). The data vessel reference 702(5) may include a reference to a data vessel data object 104. The data vessel data object 102 may correspond to the data vessel that stores the data element instance. The data vessel reference 702(5) may include a reference to the data vessel data object currently selected in the iteration step. The data vessel reference 702(5) may include a data vessel identifier 402(1) The data vessel reference 702(5) may include a number, text string, logical connector, or some other data format.

In some embodiments, the data element instance data object 700 may include a data vessel type 702(6), a data vessel format 702(7), or a data vessel location 702(8). These data may include, respectively, the type of the data vessel referenced by 702(5), the format of the data vessel referenced by 702(5), or the location of the data vessel referenced by 702(5). This data may be identical to the type 402(3), format 402(4), or location 402(5) of the data vessel data object 104 referred to in 702(5). In some embodiments, these data 702(6)-(8) may not be stored in the data element instance data object.

In one or more embodiments, the data element instance data object 700 may include one or more actors 702(9). The one or more actors 702(9) may include one or more values 304 that identify an actor that may access the corresponding data element instance. An actor may create the data element instance, use the data element instance during the function specified by 702(4), store the data element instance in the data vessel specified by 702(5), or perform one or more other actions related to or with the data element instance. The values 304 of the actors 702(9) may include identifying numbers (e.g., as depicted in FIG. 7), the actors' names, or some other type of information that can identify the actors.

In one embodiment, the data element instance data object 700 may include one or more connections 702(10). The connections 702(10) may include references to one or more other data element instance data objects 700. A connection 702(10) may correspond to a data element instance that directly precedes the data element instance corresponding to the current data element instance data object 700. A connection 702(10) may correspond to a data element instance that directly follows the data element instance corresponding to the current data element instance data object 700. A connection 702(10) may include an instance identifier 702(1) of another data element instance data object 700. A connection 702(10) may include a number, text string, logical connector, or other data format.

As an example, in FIG. 2, the data element of the physical component's dimensions may be sent from a first function (represented by the function data object 102(1)) to a second function (represented the function data object 102(2)) via a first data vessel (represented by the data vessel data object 104(1)). Then, the physical component's dimensions may be sent from the second function to a third function (represented by the function data object 102(4)) via a second data vessel (represented by the data vessel 104(4)). The system may generate a first data element instance data object 700(1) corresponding to the first data element instance (i.e., the physical component's dimensions being sent from the first function to the second function) and may generate a second data element instance data object 700(2) corresponding to the second data element instance (i.e., the physical component's dimensions being sent from the second function to the third function). The second data element instance data object 700(2) may include a connection 702(10) that includes the instance identifier 702(1) of the first data element instance data object 700(1) to show that the first data element instance directly precedes the second data element instance.

In one embodiment, selecting the subset of the data element instance data objects 700(step 606) may include selecting the subset of the data element instance data objects 700 with the same data element identifier 702(2). As discussed previously, multiple data element instance data objects 700 may include the same value 304 for their data element identifier 702(2). These data element instance data objects 700 may show how the data element flows through the physical component's lifecycle.

In some embodiments, an index may allow for the quick and efficient selection of the subset of data element instance data objects 700. In some embodiments, selecting the subset may include selecting all of the data element instance data objects 700 in the system 100 with the same data element identifier 702(2) or less than all of the data element instance data objects 700 in the system 100 with the same data element identifier 702(2). In one embodiment, selecting the subset of data element instance data objects 700(step 606) may include receiving an input that provides the value 304 of the data element identifier 702(2). The input may include user input on a UI (e.g., from a keyboard or mouse selection), data read from a file, data received from an external device, data received from another software program via an API, or some other form of input.

In some embodiments, the step of ordering the data element instance objects 700(step 608) may include ordering the subset of data element instance data objects 700 based on their respective connections 702(10). The ordering of the data element instance data objects 700 may show how the data element flows through the system. The ordering may result a branching in a tree structure or graph structure that includes the subset of data element instance data objects 700.

Figure 8:
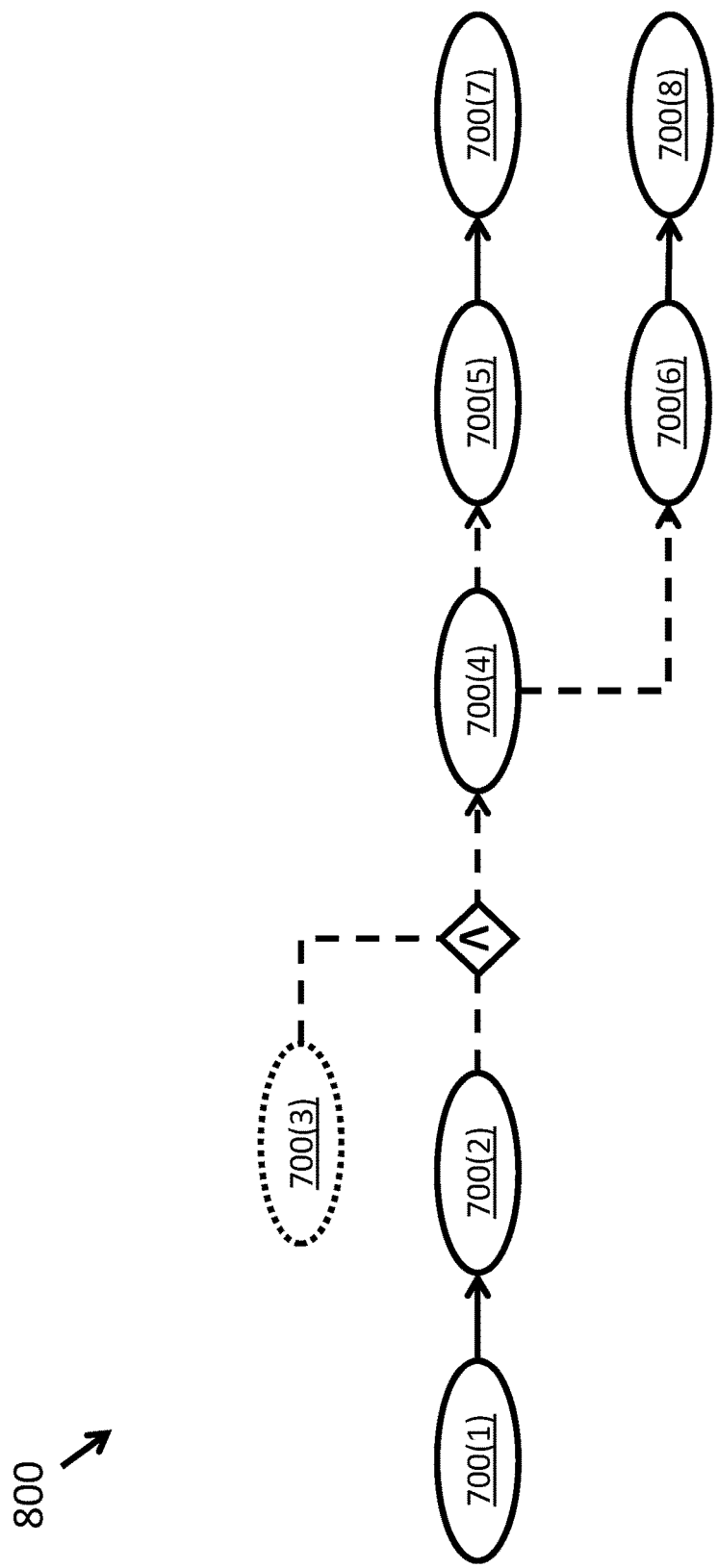
FIG. 8 is a flow diagram illustrating one embodiment of a system for improving physical components using data element mapping and analysis.

FIG. 8 depicts one embodiment of a system 800. The system 800 may include a visual representation of the ordering of the subset of data element instance data objects 700(1)-(8). As can be seen from FIG. 8, the selected data element's flow may start at data element instance data object 700(1). This may represent the data element being stored in a certain data vessel. The data element instance data object 700(1) may be connected to data element instance data object 700(2), which may represent the data element flowing to another data vessel. The data element instance data object 700(2) may be connected to data element instance data object 700(4), which may represent the data element flowing to another data vessel. The data element instance data object 700(4) may be connected to data element instance data object 700(5) and 700(6), which may represent the data element flowing to two different data vessels. The flow may continue until the data element instance data objects 700(7) and 700(8) that do not include any further connections.

In some embodiments, a different data element other than the one selected may be used with the selected data element during the process. For example, the selected data element may include the dimensions of the physical component. Another data element may include the location of an aperture on the physical component. In the system 800 of FIG. 8, a data element instance data object 700 corresponding to another data element other than the selected data element may be shown in dotted lines (e.g., the data element instance data object 700(3)).

In some embodiments, multiple data element instance data objects 700 may connect to a single data element instance data object 700. For example, both the data element instance data objects 700(2) and 700(3) connect to the data element instance data object 700(4). In FIG. 8, these data element instance data objects' 700(2), 700(3) connection to the data element instance data object 700(4) includes a "Λ" symbol, which may indicate that the data elements are combined in some way or that the other data element has some sort of effect on the data element. For example, the data element may include the dimensions of the physical component, and the other data element may include the location of an aperture on the physical component. The location of the aperture may affect the dimensions, thus, the location of the aperture may be used with the dimensions. In some embodiments, the connection may include a "V" symbol, which may include that the only one of the data elements are selected. For example, the data element may include dimensions. Two different data vessels may store the dimensions as part of different functions, and the two different instances of the dimensions may be different. The two data vessels may send the two different instances of the dimensions to the same function, and during the function, one of the instances may be selected (e.g., either by a user, software, or some other actor).

In one embodiment, a solid line between data element instance data objects 700 may correspond with the data vessels that hold the instances of the data element being digitally connected and that the flow of the data element from one of the data vessels to the other data vessel is a digital flow. For example, the data element may include the dimensions of the physical component, the data vessel associated with data element instance data object 700(1) may include a database, and the data vessel associated with data element instance data object 700(2) may include a CAD file. The flow from data element instance data object 700(1) to 700(2) may include a computer system reading from the database and automatically generating the CAD file and including the data element in the CAD file.

In certain embodiments, a dotted line between data element instance data objects 700 may correspond with the data vessels that hold the instances of the data element not being digitally connected and that the flow of the data element from one of the data vessels to the other data vessel is not a digital flow. For example, the data element may include the dimensions of the physical component, the data vessel associated with data element instance data object 700(4) may include an email, and the data vessel associated with data element instance data object 700(5) may include an engineer's notepad. The flow from data element instance data object 700(4) to 700(5) may include an engineer reading the email and copying the dimensions from the email to the notepad.

In one embodiment, the connection between two or more data element instance data objects 700 may include a digital connection (solid line) in response to (1) the data vessel type 702(6) of both data element instance data objects 700 having a "digital" value 304, (2) the destination data element instance data object 700 having a "digital" value 304, or (3) the originating data element instance data object 700 having a "digital" value 304. In one embodiment, the connection between two or more data element instance data objects 700 may include a non-digital connection (dotted line) in response to (1) the data vessel type 702(6) of both data element instance data objects 700 having a "non-digital" value 304, (2) the destination data element instance data object 700 having a "non-digital" value 304, or (3) the originating data element instance data object 700 having a "non-digital" value 304.

In one embodiment, the step of storing the ordered subset of data element instance data objects 700(step 610) may include storing the data element instance data objects 700 in a second data storage. The second data storage may be different from the first data storage of step 602 or may be same data storage. Step 610 may include storing metadata associated with the data element instance data objects 700.

The method 600 may further include displaying a visual representation of the data element instance data objects 700. This visual representation may include viewing the connections between the data element instance data objects 700. Displaying the visual representation may include displaying the visual representation on a graphical UI (GUI). The GUI may be displayed on a computing device's monitor, screen, touchscreen, or other visual output device. Displaying the visual representation may include displaying graphical elements in a similar manner to the system 800 of FIG. 8. Displaying the visual representation may include displaying a visual indication of whether a data element instance is stored in a digital or non-digital data vessel. This visual indication may be based on the data vessel type 702(6) of the data element instance data object 700. The visual indication may include a dotted arrow, as is shown in FIG. 8, or may include some other visual indication.

In one embodiment, the GUI may include graphical elements that a user of the computing device may interact with. For example, the user may use a mouse to click on a visual representation of the data element instance data object 700(2), or the user may touch the portion of a touchscreen that includes the visual representation of the data element instance data object 700(2). The user interaction may include the user dragging a data element instance data object 700 to a different location on the screen. The user interaction may include the user clicking on a data element instance data object 700. In response to the user clicking on the data element instance data object 700, the GUI may display information about the data element instance data object 700. The information may include one or more of the features 302 or values 304 discussed above in relation to the data element instance data object 700 of FIG. 7. In some embodiments, the visual representation of the data element instance data objects 700 may capture the current state of data and information flows to the level of detail such that the user can determine what must happen for the right people to access the right information, at the right time, and in the right form.

In some embodiments, the systems and methods disclosed herein may be used on a physical component's complete lifecycle with all activities and data vessels. However, in some instances, this may not feasible because of system complexity or limited resources. Therefore, in some embodiments, certain steps of the methods can be used to incrementally apply the method to different functional areas of the lifecycle and, thus, enable continuous improvement to the lifecycle and the physical component. This may also include only displaying the visual representation of only some of the data element instance data objects 700 of the currently selected data element. In some embodiments, the data element instance data objects 700 pertaining to a single data element may number 1-10, 11-100, 101-500, 501-1000, 1001-2000, or over 2001.

In some embodiments, the visual representation of the system 800 may display the names or identifiers of one or more actors that contributed to the data element instance corresponding to a data element instance data object 700. The one or more actors may be derived from the one or more actors 306(4) of a function data object 102. For example, the one or more actors 306(4) of the function data object 102 that directly preceded the data vessel data object 104 where the relevant data element instance data object 700 is stored.

In some embodiments, the method 600 may include displaying a visual representation of the system 100 of FIG. 2, which may show a visual representation of at least some of the function data objects 102, data vessel data objects 104, or the connections between these data objects. In some embodiments, the visual representation may include one or more of the actors 306(4) displayed above their function data object 102, which may show that the one or more actors listed contributed to the corresponding function. In some embodiments, if the location 402(5) of a data vessel corresponding to a data vessel data object 104 is unofficial or unknown, the visual representation of the system 100 may include a symbol near the data vessel data object 104.

The systems and method disclosed herein may improve a physical component or may improve the process of designing, fabricating, and testing the physical component. In one embodiment, improving the process of designing, fabricating, and testing may include digitally connecting the data element instances corresponding to the data element instance data objects 700 of the system 800. For example, as shown in FIG. 8, the connections between data element instance data objects 700(2) and 700(4), 700(3) and 700(4), 700(4) and 700(5), and 700(4) and 700(6) are non-digital connections, which signify that the data element is being manually transmitted between data vessels and functions. Digital connectivity would improve the process by unsiloing the data element from a siloed data vessel, making the data element more trackable, improving the speed at which the data element is transferred between functions, and removing human error. For example, instead of the dimensions of the physical component being written on an engineer's notepad, the dimensions can be stored in a database. In response to this new storage means, the dimensions are now unsiloed (i.e., no longer limited to the engineer's mind and the notepad), trackable (i.e., the database management system can record when the dimensions were inserted into the database and by whom, and can make a back-up of the database with the dimensions), arrive quicker at the next function (e.g., the next function can instantly read from the database instead of having to wait for the engineer to take the notepad to the next function), and less subject to human error (e.g., if the engineer were to misplace the notepad).

In one embodiment, improving the process of designing, fabricating, and testing may include removing one or more data element instances, which may include removing one or more corresponding data element instance data objects 700 from the system 800. In one embodiment, the method 600 may include removing, from the one or more data element instance data objects 700 and from the subset of the data element instance data objects 700, a first data element instance data objects 700. The removed data element instance data objects 700 may correspond to a data element instance that is not needed. The method 600 may include removing from one or more other data element instance data objects 700 connections 702(10) to the removed data element instance data object 700. The method 600 may include reordering the subset of data element instance data objects 700 based on these removed connections 702(10). The method 600 may include updating the ordered subset of data element instance data objects 700 in the second data storage.

As an example, in FIG. 8, the data element instance data object 700(4) may correspond to the dimensions of the physical component being stored in the mind of a manufacturing engineer, the data element instance data object 700(5) may correspond to the dimensions being in an email from the manufacturing engineer to a machine operator, and the data element instance data object 700(7) may correspond to the machine operator inputting the dimensions into a manufacturing machine. Improving the process may include the manufacturing engineer inputting the dimensions into the manufacturing machine remotely. Thus, the data element instance data object 700(5) is removed, and the process is more efficient.

In one embodiment, improving the process of designing, fabricating, and testing may include creating a connection to transmit a data element to where it is currently not used. In one embodiment, this may include the method 600 including the step of adding, to the one or more data element instance data objects 700 and to the subset of data element instance data objects 700, a new data element instance data object 700. The method 600 may include adding, to another data element instance data object 700, a connection 702(10) to the new data element instance data object 700. The method 600 may include reordering the subset of data element instance data object 700 and storing the updated subset in the second data storage.

For example, the system 800 of FIG. 8 may reveal that the data element of the dimensions of the physical component is never sent to the marketing team during a marketing function. The dimensions of the component may be useful to the marketing team in order to create accurate advertising for the component. Thus, a data element instance data object 700 may be created and connected to one of the existing data element instance data objects 700 to show the connection to the marketing team. For example, the marketing team may read the dimensions from a database that stores the dimensions and may include the dimensions in a text file containing information about the component that will be used to generate an advertisement.

In one embodiment, improving the process of designing, fabricating, and testing may include modifying a data element based on subsequent activity in a function. In some embodiments, this may include the method 600 further including the step of manufacturing the physical component based on the subset of data element instance data objects 700. This may include manufacturing the physical component based on the data elements corresponding to the data element instance data objects 700 of the subset. The method 600 may further include selecting a first data element instance data object 700(1) of the ordered subset of the data element instance data objects 700. The method 600 may include selecting a second data element instance data object 700(2) of the ordered subset of the data element instance data objects 700, and the first data element instance data object 700(1) may precede the second data element instance data object 700(2). The method 600 may include adding a connection 702(10) from the second data element instance data object 702(2) to the first data element instance data object 702(1). The method 600 may further include manufacturing an updated version of the physical component based on the subset of the data element instance data objects 700 with the new connection. In some embodiments, modifying a data element may be based on a data element generated by a sensor of the manufacturing process of the physical component.

For example, after the physical component has been manufactured, during a testing function it may be discovered that the dimensions of the physical component need to be adjusted. The data element instance data object 700(8) may correspond to an instance of the dimensions during the testing function, and the data element instance data object 700(1) may correspond to the dimensions during a design function. A connection 702(10) may be added to the data element instance data object 700(8) connecting it to the data element instance data object 700(1). This may correspond to sending the old dimensions back to the design function to be adjusted. The physical component may be remanufactured with the new dimensions.

In some embodiments, portions of the systems and methods disclosed herein may be performed by a computing device. In one embodiment, the computing device may execute software that performs at least some of the systems and methods disclosed herein. For example, a computing device may present different GUIs that may guide a user through the process of inputting information about functions, data vessels, connections, data elements, or other components discussed herein. The computing device may generate the various data objects as disclosed herein. The computing device may include an API that may allow one or more of the data objects to converted into a different data form that other software may use, such as PLM or model-based systems engineer (MBSE) software.

While the above disclosure has been discussed mainly in reference to improving a physical component, the systems and methods disclosed herein are readily applicable to other technical or industry fields. For example, the systems and methods of the disclosure could be used in the field of supply chain management. The function data objects 102 may correspond to entities in the supply chain (e.g., manufacturers, suppliers, retailers, wholesalers, etc.), the data vessel data objects 104 may correspond to locations where products, materials, etc. are kept in the course of the supply chain, or data element instance data objects 700 may correspond to instances of a material, product, etc. in its movement through the supply chain. In some embodiments, the physical component may include a traditionally manufactured component, an additively manufactured component, a component used in a materials and structures application, or some other type of component.

In some embodiments, the systems and methods of the disclosure may be applicable to a system engineering process. Within systems engineering, there is often a lack of integration between the involved disciplines such as engineering, management, science, and finances. The systems and methods disclosed herein can serve as an invaluable tool in defining the data relationship across these functional activities that correspond to these disciplines and thus serve as an enabler of cross-disciplinary system integration. The definition of external system interfaces and their elements can be one of the most important, yet often overlooked, systems engineering requirements tasks. The systems and methods disclosed herein may be used in this context as a systematic method to uncover and define the data requirements for system interfaces for the Systems Requirements Specifications. Within the concept of system science, there is the concept of "black box/white box" system representation. The "black box" view may be that of the external system, and the "white box" may include an internal view of system that shows the structure of the elements. An understanding of both the "black box" and "white box" view of the system and the relationship between the two may be important for system understanding. The systems and methods disclosed herein may serve as a tool to systematically determine and manage the data relationships between system elements and the functions to which they correspond, thus marrying the "black box" and "white box" views.

Prior visual mapping systems and methods have often relied on functional, document, and software-centric views of data. This often presents disadvantages compared to the present disclosure because data elements, and not documents and software, are used to drive value in an organization. The data vessel can be analogous to a physical container that is used to move and store materials in a manufacturing facility. In the same way a physical container may be used for inventory management and transportation in manufacturing, the data vessel may be used to facilitate the manual storage and transference of data elements across a component's lifecycle. The systems and methods disclosed herein offer a tool uniquely suitable for application of lean manufacturing to data and information flows. Waste categorizations for data and information flows could be used to assist in identification and elimination of waste in both the data vessel and data element level views captured by the present disclosure.

In some embodiments, the systems and methods disclosed herein may use artificial intelligence and machine learning to perform real-time optimization of data and information flows at the data element level. This may optimize data and information flows alongside the development of a system or physical component.

In some embodiments, the systems and methods disclosed herein may reveal which data elements constitute tribal knowledge, which may include information within an organization that is not widely known. Such systems and methods may determine that some data elements are not only siloed in disparate data vessels within computer systems but also within the minds of people relevant to the physical component's lifecycle. The systems and methods disclosed herein may provide suggestions on how to make such data elements widely known and more accessible.

The definition of "products" is becoming exceptionally complex and two-dimensional drawings may be unsuitable for properly capturing this complexity. Therefore, a model-based definition has been proposed as an alternative to meet the needs of modern enterprises. There is an ongoing effort to establish common information models as a means of enabling the model-based definition of "product." Persistent identification of product-definition elements has been identified as a research gap in enabling model-based manufacturing and inspection. The output of the systems and methods disclosed herein can enable industry to systematically uncover these elements and their relationships with one another.

In some embodiments, the systems and methods disclosed herein may capture relevant data and information flows within a physical component's lifecycle and may be used alongside a model-based definition to realize the model-based enterprise and establish a complete product definition. Errors may be more likely to accumulate as drawing-based definitions are passed throughout the lifecycle, and given that a lifecycle may include thousands of data element instances related to the realization of engineering drawings, this realization is even more impactful. Therefore, many instances of data element exchange and interaction are important, and the realization of the digital thread and the model-based enterprise can eliminate thousands of single point failures in data elements.

In some embodiments, important design information for reuse may include information that relates to system model and testing/verification methods. In conventional lifecycle for a physical component, verification and validation data may be very likely to be unstructured or non-digital (in some cases, as low as 5%) and, thus, unlikely to be saved for reuse. In some embodiments, the systems and methods disclosed herein may increase digital connectivity between functions or data vessels significantly, for example, from 22% to 75%.

In one or more embodiments, the systems and methods disclosed herein may determine, find, or present a digital thread. The digital thread is a concept within digital transformation and is often defined as the connection of data and information flows throughout a product lifecycle. The name "digital thread" should not be understood to imply a single thread connecting all data. The system 800 shows one embodiment of a digital thread. The various data element instance data objects 700(1)-(2) and 700(4)-(9) show how a single data element flows throughout a physical component lifecycle and how the different instance of the data element are connected.

While the making and using of various embodiments of the present disclosure are discussed in detail herein, it should be appreciated that the present disclosure provides many applicable inventive concepts that are embodied in a wide variety of specific contexts. The specific embodiments discussed herein are merely illustrative of specific ways to make and use the disclosure and do not delimit the scope of the disclosure. Those of ordinary skill in the art will recognize numerous equivalents to the specific apparatuses, systems, and methods described herein. Such equivalents are considered to be within the scope of this disclosure and may be covered by the claims.

Furthermore, the described features, structures, or characteristics of the disclosure may be combined in any suitable manner in one or more embodiments. In the description contained herein, numerous specific details are provided, such as examples of programming, software, user selections, hardware, hardware circuits, hardware chips, or the like, to provide understanding of embodiments of the disclosure. One skilled in the relevant art will recognize, however, that the disclosure may be practiced without one or more of the specific details, or with other methods, components, materials, apparatuses, devices, systems, and so forth. In other instances, well-known structures, materials, or operations may not be shown or described in detail to avoid obscuring aspects of the disclosure.

These features and advantages of the embodiments will become more fully apparent from the description and appended claims, or may be learned by the practice of embodiments as set forth herein. As will be appreciated by one skilled in the art, aspects of the present disclosure may be embodied as an apparatus, system, method, computer program product, or the like. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, aspects of the present disclosure may take the form of a computer program product embodied in one or more computer-readable media having program code embodied thereon.

In some embodiments, a module may be implemented as a hardware circuit comprising custom (very large-scale integration) VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the program code may be stored and/or propagated on in one or more computer-readable media.

In some embodiments, a module may include a smart contract hosted on a blockchain. The functionality of the smart contract may be executed by a node (or peer) of the blockchain network. One or more inputs to the smart contract may be read or detected from one or more transactions stored on or referenced by the blockchain. The smart contract may output data based on the execution of the smart contract as one or more transactions to the blockchain. A smart contract may implement one or more methods or algorithms described herein.

The computer program product may include a computer-readable storage medium (or media) having computer-readable program instructions thereon for causing a processor to carry out aspects of the present disclosure. The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium may include a portable computer diskette, a random access memory ("RAM"), a read-only memory ("ROM"), an erasable programmable read-only memory ("EPROM" or Flash memory), a static random access memory ("SRAM"), a hard disk drive ("HDD"), a solid state drive, a portable compact disc read-only memory ("CD-ROM"), a digital versatile disk ("DVD"), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present disclosure.

Aspects of the present disclosure are described herein with reference to flowchart illustrations or block diagrams of methods, apparatuses, systems, algorithms, or computer program products according to embodiments of the disclosure. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The schematic flow chart diagrams included herein are generally set forth as logical flow chart diagrams. As such, the depicted order and labeled steps are indicative of one embodiment of the presented method. Other steps and methods may be conceived that may be equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The schematic flowchart diagrams and/or schematic block diagrams in the Figures illustrate the architecture, functionality, and operation of possible implementations of apparatuses, systems, methods and computer program products according to various embodiments of the present disclosure. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and program code.

Thus, although there have been described particular embodiments of the present disclosure of a new and useful improving physical components using data element mapping and analysis, it is not intended that such references be construed as limitations upon the scope of this disclosure.

What is claimed is:

1. A system for improving a physical component, the system comprising:
   a computer processor; and
   a non-transitory computer-readable storage medium storing executable instructions thereon, wherein the computer processor is configured, in response to executing the executable instructions, to:
   access a first data storage, wherein the first data storage stores
     a plurality of function data objects, wherein each function data object of the plurality of function data objects includes a reference to one or more data vessel data objects, and
     a plurality of data vessel data objects, wherein each data vessel data object includes a reference to one or more function data objects of the plurality of function data objects;
   iterate over the plurality of data vessel data objects, and for each data vessel data object, generating one or more data element instance data objects, wherein each data element instance data object of the one or more data element instance data objects includes
     a data element identifier,
     a reference to a function data object,
     a reference to the data vessel data object,
     data identifying one or more actors, wherein the one or more actors access a data element instance of the data element instance data object, and
     one or more references to one or more other data element instance data objects,
     wherein the one or more data element instance data objects form a plurality of data element instance data objects;
   select a subset of the plurality of data element instance data objects, wherein one or more data element instance data objects of the subset having the same data element identifier;
   order the subset based on one or more references of the one or more data element instance data objects of the subset to one or more other data element instance data objects of the subset; and
   store the ordered subset in a second data storage as a digital thread.

2. The system of claim 1, wherein the computer processor is further configured to:
   remove, from the one or more data element instance data objects and from the subset, a first data element instance data object;
   remove, from a second data element instance data object, a reference to the first data element instance data object;
   reorder the subset based on the one or more references of the one or more data element instance data objects of the subset to the one or more other data element instance data objects of the subset;
   update the ordered subset in the second data storage.

3. The system of claim 1, wherein the computer processor is further configured to:
   add, to the one or more data element instance data objects and to the subset, a first data element instance data object;
   add, to a second data element instance data object, a reference to the first data element instance data object;
   reorder the subset based on the one or more references of the one or more data element instance data objects of the subset to the one or more other data element instance data objects of the subset;
   update the ordered subset in the second data storage.

4. The system of claim 1, wherein the physical component includes an additively manufactured component.

5. The system of claim 1, wherein a function data object of the plurality of function data objects further includes a function identifier, and wherein the function identifier uniquely identifies the function data object among the plurality of function data objects.

6. The system of claim 1, wherein a data vessel data object of the plurality of data vessel data objects further includes a data vessel identifier, and wherein the data vessel identifier uniquely identifies the data vessel data object among the plurality of data vessel data objects.

7. The system of claim 6, wherein the data vessel data object further includes a data vessel type, a data vessel format, and a data vessel location.

8. The system of claim 7, wherein the data vessel type includes data indicating whether a corresponding data vessel is a digital data vessel or a non-digital data vessel.

9. The system of claim 1, wherein each data element instance data object of the plurality of data element instance data objects further includes a data vessel type based on data vessel type of a data vessel data object of the plurality of data vessel data objects.

10. The system of claim 9, wherein the computer processor is further configured to:
    display a visual representation of the ordered subset; and
    wherein, for each data element instance data object in the subset, the visual representation includes a visual indication based on the data vessel type of the data element instance data object, wherein the visual indication includes a connection to a subsequent data element instance data object of the plurality of data element instance data objects.

11. A system for improving a physical component, the system comprising:
    a computer processor; and
    a non-transitory computer-readable storage medium storing executable instructions thereon, wherein the computer processor is configured, in response to executing the executable instructions, to:

access a first data storage, wherein the first data storage stores
   a plurality of function data objects, wherein each function data object of the plurality of function data objects includes a reference to one or more data vessel data objects, and
   a plurality of data vessel data objects, wherein each data vessel data object includes a reference to one or more function data objects of the plurality of function data objects;
iterate over the plurality of data vessel data objects, and for each data vessel data object, generating one or more data element instance data objects, wherein each data element instance data object of the one or more data element instance data objects includes
   an instance identifier,
   a data element identifier,
   a reference to a function data object,
   a reference to the data vessel data object,
   data identifying one or more actors, wherein the one or more actors access a data element instance of the data element instance data object, and
   one or more references to one or more other data element instance data objects,
   wherein the one or more data element instance data objects form a plurality of data element instance data objects;
select a subset of the plurality of data element instance data objects, wherein one or more data element instance data objects of the subset having the same data element identifier;
order the subset based on one or more references of the one or more data element instance data objects of the subset to one or more other data element instance data objects of the subset;
receive input from a user, wherein the input includes a selection of a first data element instance data object of the one or more data element instance data objects;
remove, from the one or more data element instance data objects and from the subset, a first data element instance data object;
remove, from a second data element instance data object, a reference to the first data element instance data object;
reorder the subset based on the one or more references of the one or more data element instance data objects of the subset to the one or more other data element instance data objects of the subset; and
store the ordered subset in a second data storage as a digital thread.

12. The system of claim 11, wherein each data element instance data object of the plurality of data element instance data objects further includes a data vessel format, and wherein the data vessel data format is based on a data vessel format of a data vessel data object.

13. The system of claim of claim 12, wherein the data vessel format of the data element instance data object includes at least one of:
   text;
   Portable Document Format (PDF);
   Computer Assisted Drawing (CAD);
   database; or
   paper.

14. The system of claim 11, wherein each data element instance data object of the plurality of data element instance data objects further includes a data vessel type, and wherein the data vessel type is based on a data vessel type of data vessel data object.

15. The system of claim 14, wherein the computer processor is further configured to:
   display a visual representation of the ordered subset;
   wherein, for each data element instance data object in the subset, the visual representation includes a visual indication based on the data vessel type of the data element instance data object; and
   wherein the visual indication includes a connection to a subsequent data element instance data object.

16. A method for improving a physical component, the method comprising:
   accessing a first data storage, wherein the first data storage stores
      a plurality of function data objects, wherein each function data object of the plurality of function data objects includes a reference to one or more data vessel data objects, and
      a plurality of data vessel data objects, wherein each data vessel data object includes a reference to one or more function data objects of the plurality of function data objects;
   iterating over the plurality of data vessel data objects, and for each data vessel data object, generating one or more data element instance data objects, wherein each data element instance data object of the one or more data element instance data objects includes
      a data element identifier,
      a reference to a function data object,
      a reference to the data vessel data object,
      data identifying one or more actors, wherein the one or more actors access a data element instance of the data element instance data object, and
      one or more references to one or more other data element instance data objects,
      wherein the one or more data element instance data objects form a plurality of data element instance data objects;
   selecting a subset of the plurality of data element instance data objects, wherein one or more data element instance data objects of the subset having the same data element identifier;
   ordering the subset based on one or more references of the one or more data element instance data objects of the subset to one or more other data element instance data objects of the subset; and
   storing the ordered subset in a second data storage as a digital thread.

17. The method of claim 16, comprising manufacturing the physical component based on the subset.

18. The method of claim 17, further comprising:
   selecting a first data element instance data object of the ordered subset;
   selecting a second data element instance data object of the ordered subset, wherein the first data element instance data object precedes the second data element instance data object; and
   adding, to the second data element instance data object, a reference to the first data element instance data object.

19. The method of claim 18, further comprising manufacturing an updated version of the physical component based on the ordered subset.

* * * * *

UNITED STATES PATENT AND TRADEMARK OFFICE
CERTIFICATE OF CORRECTION

Page 1 of 1

PATENT NO. : 12,131,134 B1
APPLICATION NO. : 18/067888
DATED : October 29, 2024
INVENTOR(S) : Allison Brown Ledford et al.

It is certified that error appears in the above-identified patent and that said Letters Patent is hereby corrected as shown below:

On the Title Page

Item (73) Assignee:
Please change "AUBURN UNIVERSITY, Auburn, AL (US)" to "AUBURN UNIVERSITY, Auburn, AL (US) and UNITED STATES GOVERNMENT AS REPRESENTED BY THE SECRETARY OF THE ARMY, Washington, DC (US)"

Signed and Sealed this
Twenty-fifth Day of February, 2025

Coke Morgan Stewart
*Acting Director of the United States Patent and Trademark Office*